United States Patent [19]

Basic, Sr.

[11] Patent Number: 5,413,715

[45] Date of Patent: May 9, 1995

[54] INCINERATOR IMPROVEMENTS

[76] Inventor: John N. Basic, Sr., 41 W. 202 Whitney Rd., St. Charles, Ill. 60175

[21] Appl. No.: 43,283

[22] Filed: Apr. 6, 1993

Related U.S. Application Data

[63] Continuation-in-part of Ser. No. 685,630, Apr. 15, 1991, Pat. No. 5,209,169, which is a continuation-in-part of Ser. No. 60,761, Jun. 1, 1987, Pat. No. 5,007,353, which is a continuation-in-part of Ser. No. 659,849, Oct. 9, 1984, Pat. No. 4,706,578, which is a continuation of Ser. No. 362,853, Mar. 29, 1982, Pat. No. 4,475,469, which is a continuation-in-part of Ser. No. 248,054, Mar. 27, 1981, Pat. No. 4,438,705.

[51] Int. Cl.⁶ ............................................. B01D 21/04
[52] U.S. Cl. ..................................... 210/803; 210/141; 210/170; 210/523; 210/743; 37/341; 37/342; 37/400
[58] Field of Search ................ 210/141, 170, 523, 803, 210/747; 37/340, 341, 342, 400

[56] References Cited

U.S. PATENT DOCUMENTS

| 683,775 | 10/1901 | Kirkpatrick | 37/341 |
| 702,250 | 6/1902 | Sharp | 37/341 |
| 2,046,874 | 7/1936 | Hudson | 37/341 |
| 4,356,778 | 10/1982 | McRee, Jr. | 110/244 |
| 4,363,735 | 12/1982 | Hook | 210/747 |
| 4,724,088 | 2/1988 | Zetterlund | 210/803 |

Primary Examiner—Robert A. Dawson
Assistant Examiner—David Reifsnyder
Attorney, Agent, or Firm—Eugene F. Friedman

[57] ABSTRACT

An ash scoop which remains out of the water during most of its operation. The ash scoop has a retaining and a nonretaining configuration. It moves along a track downward into the pit while poised in its nonretaining configuration. Once in the pit, it moves to its retaining position to grab debris within the pit. It then moves back out of the pit along the track until it reverts to its nonretaining configuration to dump the ashes dragged out of the pit.

96 Claims, 17 Drawing Sheets

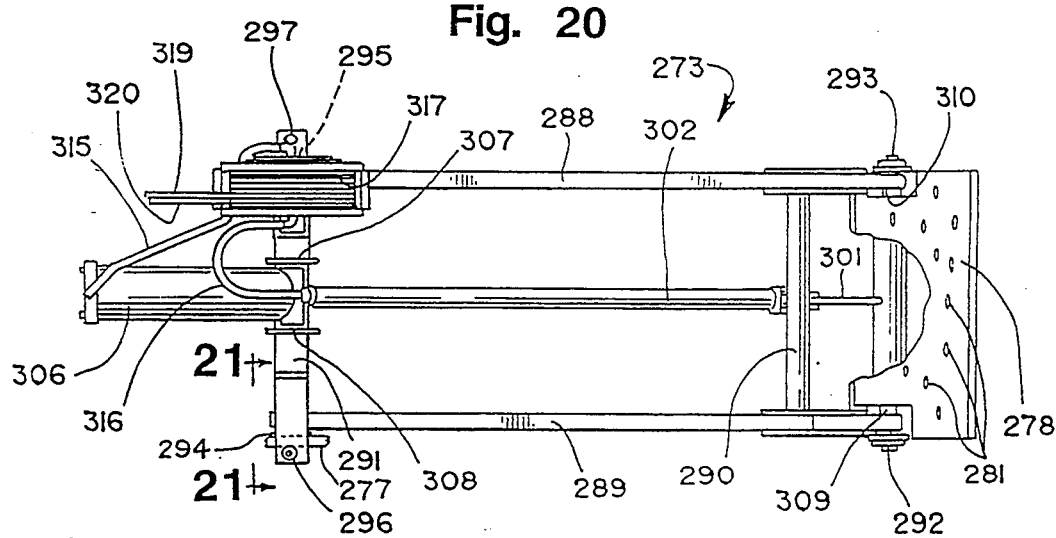
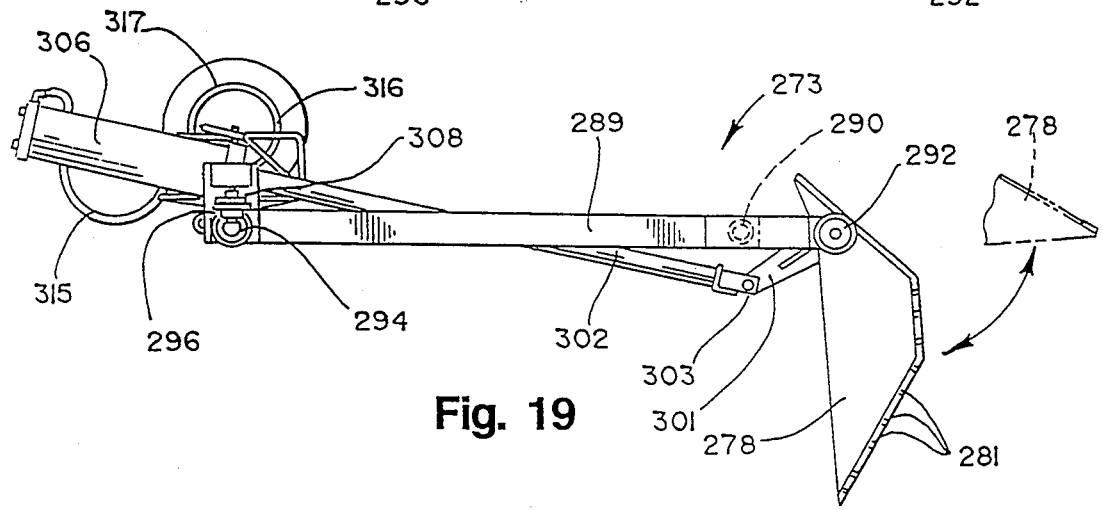
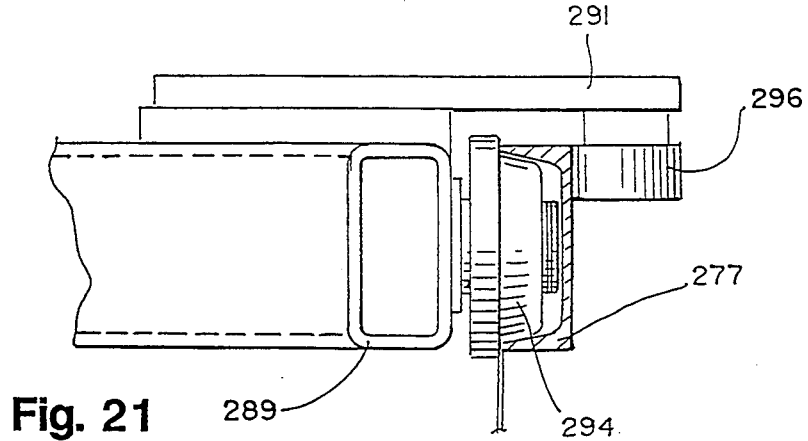

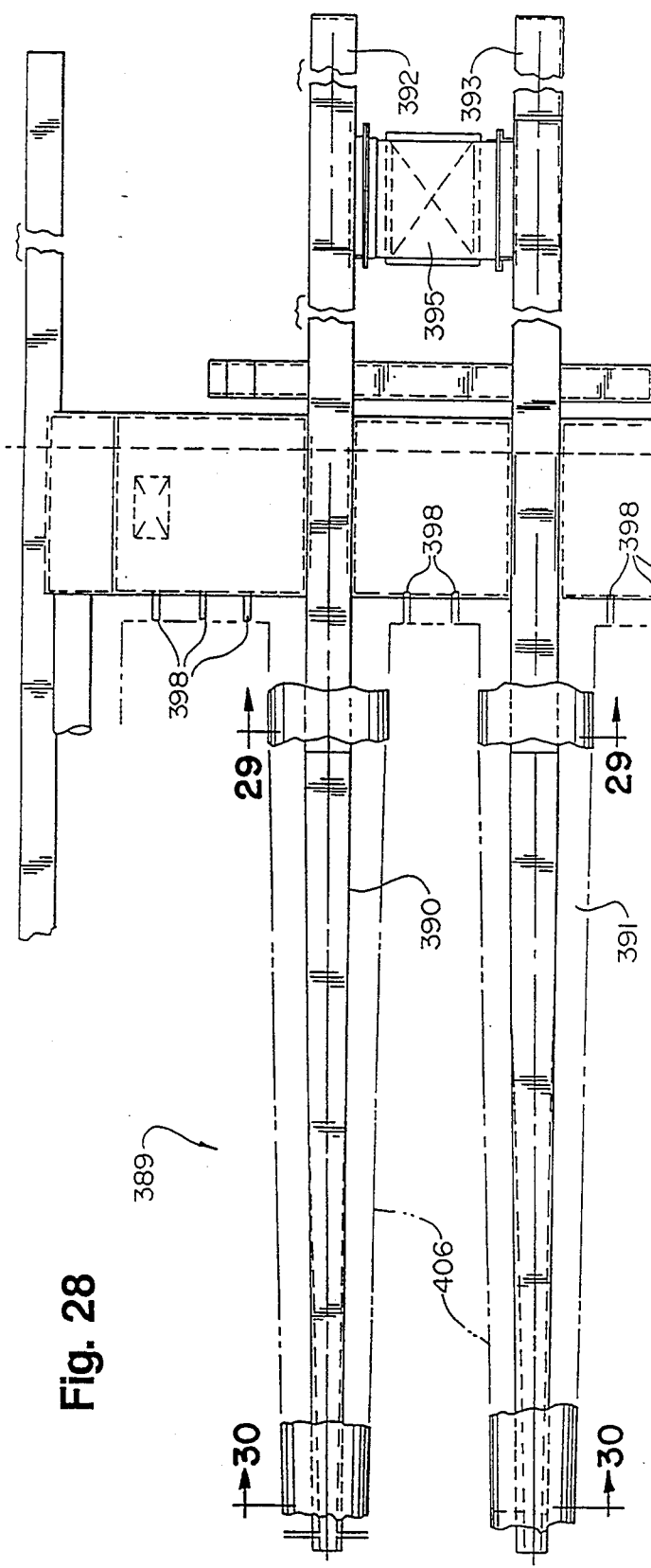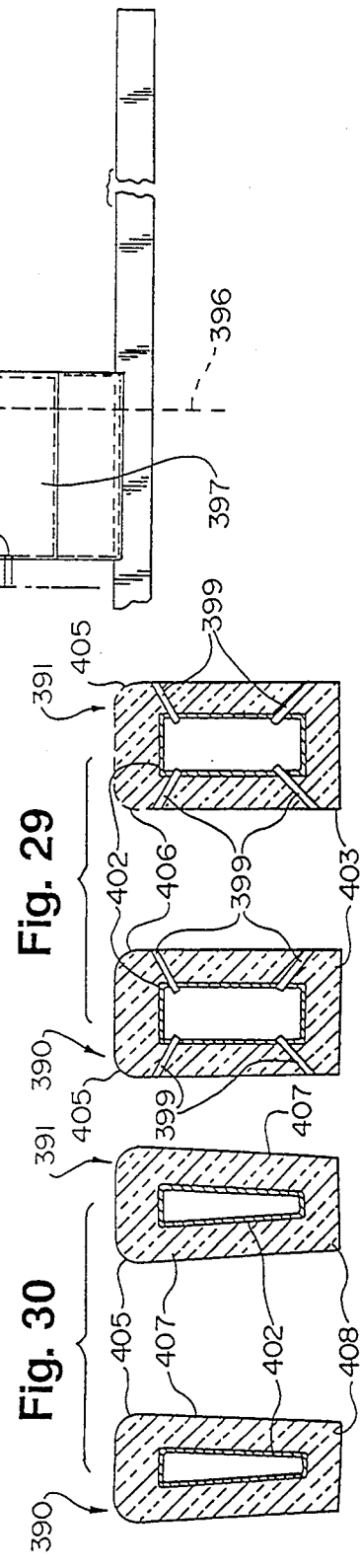

INCINERATOR IMPROVEMENTS

The present application constitutes a continuation-in-part of U.S. patent application Ser. No. 7/685,630, filed Apr. 15, 1991, now U.S. Pat. No. 5,209,169, issued May 11, 1993, which was a continuation-in-part of U.S. patent application Ser. No. 7/60,761, filed Jun. 1, 1987, now U.S. Pat. No. 5,007,353, issued on Apr. 16, 1991, which also was a continuation-in-part of U.S. patent application Ser. No. 659,849 filed Oct. 9, 1984, now U.S. Pat. No. 4,706,578, which itself represents a continuation of U.S. patent application Ser. No. 362,853 filed Mar. 29, 1982, now U.S. Pat. No. 4,475,469, which in turn constitutes a continuation-in-part of U.S. patent application Ser. No. 248,054 filed Mar. 27, 1981, now U.S. Pat. No. 4,438,705.

BACKGROUND

John N. Basic, Sr., in his U.S. Pat. No. 4,438,705, issued on Mar. 27, 1984, and U.S. Pat. No. 4,516,510 issued on May 14, 1985, both entitled "Incinerator with Two Reburn Stages and, Optionally, Heat Recovery", provided an incinerator system and techniques that very significantly advanced the art of incinerating refuse. The disclosures provided equipment and methods for taking waste of vastly different descriptions, heat contents, and wetness and, within one type of equipment, incinerating them in an environmentally acceptable manner. These disclosures merit a careful understanding and are incorporated by reference.

Not only do Basic's two patents provide a complete incinerator system for burning refuse in bulk or hydrocarbon liquids, they also provide equipment and techniques for incinerating hydrocarbon-containing fumes from sources which may produce them. Again, they accomplish this result without substantial deleterious effect upon the environment.

Naturally, in a system as complex as that shown by Basic in his two patents, a consideration of the various components by a creative mind can suggest and lead to improvements and further developments that can improve the efficiency of the system. Thus, for example, Basic's U.S. Pat. No. 4,475,469, issued on Oct. 9, 1984, discloses, in conjunction with the above two patents, an improved hearth floor which moves under the influence of impulses to urge the burning debris along from the inlet of the main chamber to the ash outlet. This pulsating hearth developed by Basic represents a significant improvement on the major advances disclosed in his two incinerator patents referenced above.

Austrian patent 317,401 to Bent Faurholdt, published on Aug. 26, 1974, introduces air into a reburn tunnel, through a pipe placed on the middle of that tunnel itself. However, Faurholdt suggests no use for his pipe other than introducing the air into the tunnel. Furthermore, introducing the air through perforations in the pipe results in a "T" configuration for the velocity components of the gases. This may even result in the air thus introduce resisting the flow of gases through the reburn tunnel.

Accordingly, the present invention provides additional improvements to an incinerator system that will increase its efficiency. At the same time, the system will have the ability to reach operating temperatures prior to the introduction to refuse and with the expenditure of only minimal amounts of auxiliary fuel. Additionally, in general, the developments provide greater ease in the utilization of an incinerator system.

SUMMARY

Typically, a fume burning system improves the environmental quality of a gaseous fluid emanating from the output of some source. That source will contain combustible hydrocarbons. The fume burning system should include a reburn unit having an inlet opening coupled to and in fluid communication with the output of the source of the fluid. The reburn unit also includes an outlet opening for the egress of the gaseous products of combustion from it. Additionally, it should have a burner, coupled to the unit, which burns the fuel inside of the reburn unit. This has the purpose of maintaining the temperature at a level that insures the complete burning of the combustible hydrocarbons. To further permit the burning, the reburn unit includes oxygenating means coupled to it. This component introduces an oxygen-containing gas into the reburn unit to support combustion.

One improvement of this type of a fume burner involves splitting the reburn unit itself into first and second reburn sections. Basically, they each represent a twin of the other and either can accomplish the functions without the other operating at all.

To permit the use of two separate reburn sections, the inlet opening to the reburn unit includes first and second inlet ports coupled to and in fluid communication with the output of the hydrocarbon source. The first and second inlet ports open into the first and second reburn sections respectively.

Similarly, the outlet opening includes first and second outlet ports. These represent the outlets for the first and second reburn sections, respectively.

Further, the burner and the oxygenating means each includes first and second sections. The first section for these two components couples to the first reburn section while the second section of these components couples to the second reburn section. In each of the two reburn sections, the burner section and the oxygenating means performs their functions of burning a fuel and introducing the oxygen-containing gas.

As an entirely separate improvement, the reburn unit whether or not composed of two sections, may include an excitor placed within, surrounded by, and coupled to the reburn unit. The excitor, as a minimal purpose, in effect reduces the cross-sectional area through which the oxygen-containing gas must travel to reach the combustible hydrocarbons. Furthermore, it provides a reflective surface which will permit the heat either entering or generated within the reburn unit to reach the gaseous molecules to further encourage complete combustion.

Within the reburn unit, the majority of the length of the excitor, in passing from the reburn's inlet to the reburn's outlet, should remain out of contact with wall of the reburn unit. The excitor has the purpose of reducing the cross-sectional area on planes transverse to the path passing from the inlet opening to the outlet opening of the reburn unit.

The excitor, in this configuration, may serve to introduce the oxygen-containing gas into the reburn unit. It does so with nozzles, in fluid communication with the oxygenating mechanism and having an arrangement on the surface of the excitor. The nozzles introduce the air into the space between the inner surface of the reburn unit and the excitor and does so at a nonperpendicular angle to the direction of the path from the inlet to the outlet of the excitor. By thus avoiding the "T" configuration, the air entering the reburn unit through the nozzles will aid the turbulence of the gas without retarding or blocking its progress.

However, the excitor need not introduce the air or other oxygen-containing gas into the reburn unit to have an important and useful function. It may remain passively within the reburn unit to reflect the heat generated or introduced there. This will maintain the gases at an elevated temperature in which they will undergo their efficient and thorough combustion. To accomplish this, the surface of the excitor facing the interior of the reburn should have a composition of a heat and corrosion resistant material. This precludes its destruction at the temperatures and in the gaseous environments at which the reburn unit operates.

Stated alternately, the excitor should not absorb and pass the heat from the reburn unit into its interior. Rather, it should have a relatively low thermal conductivity to effectuate the reflection of the heat from its surface back into the gases undergoing combustion. As a convenient limit, the surface of the excitor facing the interior of the reburn should have a composition of a material with a thermal conductivity constant k less than about $$\frac{60 \text{ Btu, in.}}{\text{hr. ft.}^2 \text{ °F.}}$$

where k is defined by $$k = \frac{ql}{AT}$$

where q is the heat conductivity in Btu/Hr. through a surface of thickness l in inches, area A in square feet, and temperature T in degree F.

Whether with or without twin reburn sections or an excitor, a fume burner, when having a low input of gaseous fluid, may operate more efficiently when it permits a lower throughput of gases. To accomplish this objective, the fume burner may include a choking device coupled to its outlet opening to selectively reduce the cross-sectional area of this outlet opening. This will retain the gases within the reburn unit for a sufficient period of time to accomplish full combustion even though it has a minimal input. This may also find use upon the initial commencement of operation of the unit after it has cooled down and before introducing refuse. The unit can then reach operating temperature where it avoids environmental pollution. Reversing the damping effect and permitting the return unit's outlet opening to revert to its full size then allows the system's normal operation.

Rather than merely operating as fume burners, the components given above may form part of an integrated incinerator system. In this instance, in addition to the reburn unit with whatever improvements of those given above it may incorporate, the incinerator system will also include a main combustion chamber having an inlet for the introduction of solid bulk refuse. An outlet opening from the main chamber permits the egress of the gaseous products of combustion from there. The outlet opening from the main combustion chamber then couples to and displays fluid communication with the inlet opening of the reburn unit.

The method of burning fumes utilizing twin reburn tunnels involves passing the fumes from an output of a source directly into the inlet openings of first and second reburn sections. To maintain a desired temperature, the process will generally require burning a fuel in these two reburn sections. In order to promote the combustion of the gases, an oxygen-containing gas must be introduced into the reburn sections. Lastly, the gaseous combustion products within the reburn sections pass out through outlet openings.

To effectuate combustion with an excitor does not necessitate, of course, twin reburn sections. Rather, the fumes emanating from the output of a source pass into the inlet opening of a reburn unit. While there, they pass around an excitor placed within, surrounded by, and coupled to the reburn unit. The majority of the length of the excitor, passing from the reburn's inlet to its outlet, remains out of contact with the wall of the reburn unit.

To maintain the proper temperature, typically a fuel undergoes burning within the reburn unit. Then, as before, an oxygen-containing gas must enter the reburn unit to achieve combustion of the hydrocarbons. The oxygen-containing gas enters the space between the inner surface of the reburn and the excitor at a nonperpendicular angle relative to the direction of the flow of the gas in that space. Finally, the gaseous combustion products pass out of the reburn unit.

As an alternate aspect, the burning of fumes proceeds in a reburn unit as generally indicated above. The combustion of fuel in that unit maintains the desired temperature. Introducing the oxygen-containing gas permits the combustion of the fumes as required. The area of the outlet opening through which the gaseous combustion products pass out of the reburn unit may be selectively reduced in order to maintain the temperature in the unit at the desired level with the addition of minimal or no auxiliary fuel.

The burning of refuse according to these developments delineated above requires, in addition to the procedures discussed above for fume burning, the placing of refuse through an inlet opening into a main incinerator chamber. There, the bulk refuse burns to produce gaseous combustion products. These combustion products pass out of the main combustion chamber through an outlet opening and directly into an inlet opening of the reburn unit.

An improved burning may result for particular types of refuse where the main incinerator chamber has a grate device located above the floor of the main chamber in close proximity to the inlet opening. The grating device should hold the refuse for a limited period of time after its introduction through the inlet opening. Subsequently, the grate device allows the refuse to drop through, while continuing to burn, to the floor of the main chamber.

The use of an auxiliary grate of this fashion may prove propitious for various types of refuse including material having a large content of moisture or with a large amount of high Btu combustibles. In the former instance, the retention of the refuse for a brief period of time on the grate allows it to dry before it drops to the chamber floor. Otherwise, maintaining the fire in the desired condition might prove more difficult.

With the high Btu refuse, maintaining it on the grate allows a portion of it to volitalize and begin to burn at relatively high temperatures. When the remainder drops through the grate, it has a lower temperature and thus would have less of a propensity to induce slagging on the chamber floor.

A system with further improvements may also include a cooling device to reduce the temperature of the grate. This cooling device may conveniently incorporate nozzles, coupled to the grate, and an oxygenating device, coupled to the nozzles. The cooling device then passes an oxygen containing gas through the nozzles which then enters the incinerator chamber. This gas, most conveniently air, serves to both reduce the temperature of the grate and support combustion within the incinerator chamber.

The method of burning refuse to obtain this advantage involves placing it through an inlet opening into an enclosed main chamber of an incinerator system and, specifically, onto a grate located within the main chamber. A fire-resistant floor sits below the grate. The process continues with the partial burning of the refuse while on the grate.

While the refuse continues to burn, it is then placed, generally through dropping, onto the chamber's floor. Finally, the burning of the refuse continues while it sits on the floor.

The grate may undergo cooling by passing a fluid through it. Where this fluid represents an oxygen-containing gas, it may travel through the grate and then out through nozzles coupled to the grate and into the main incinerator chamber. Thus, it not only cools the grate, but also supports combustion.

Often, the burning of the refuse in the incinerator produces ashes dumped into a pit filled with water. The water, in fact, provides a seal between the environment on the inside of the incinerator and that of the room on the outside. These ashes must undergo removal from time to time to avoid filling the pit.

An improved device for removing the ashes from the pit includes first an elongated track having its first end located in proximity to the pit. The second end lies further away and at a higher level than the first end.

A scooping device moves along the track and displays first and second configurations. In the first configuration, it holds onto the ashes while, in the second, it releases whatever ashes it may be holding.

An elevator moves the scoop device along the track until it reaches a first position near the first end in the pit. In this position, the scoop itself sits in the water in the pit.

The elevator can then move the scoop to a second position near the other end of the track. At this location, the scoop sits entirely out of the water of the pit.

Lastly, a control device couples to the scoop. The controller moves the scoop, when at the first location inside the pit, from the second to the first of the configurations. This allows the scoop to actually grab onto ashes and other debris within the pit.

When at the second, or elevated, position, the controller causes the scoop to move from the first to the second configurations. As a result, the scoop releases the ashes it may have held. Typically, the ashes will then fall into a bin or truck.

The removal of the ashes or other debris from the pit commences by moving the scoop downward along the track until it reaches the first end located in proximity to the pit. The downward movement of the scoop then stops.

The scoop then changes its configuration so that it may retain the debris in the pit. While remaining in the configuration to retain the debris, the scoop moves upward along the track and out of the pit. While out of the pit, the scoop changes from the first to the second configuration in which it drops the ashes at an appropriate location.

BRIEF DESCRIPTION

FIG. 1 gives a perspective view of an incinerator system installation.

FIG. 2 presents a top plan view of a reburn unit having two separate reburn tunnels with each tunnel having two separate reburn stages.

FIG. 3 provides a side elevational view of the reburn unit shown in FIG. 2 and also shows further stages for processing the exhaust gases.

FIG. 4 gives a cross-sectional view of the twin reburn tunnels of FIG. 3 along the line 4—4.

FIG. 5 provides a close-up view, partially in section, of the damper that can serve to close off either or even both of the twin reburn tunnels of FIGS. 1 to 4.

Figure 8:
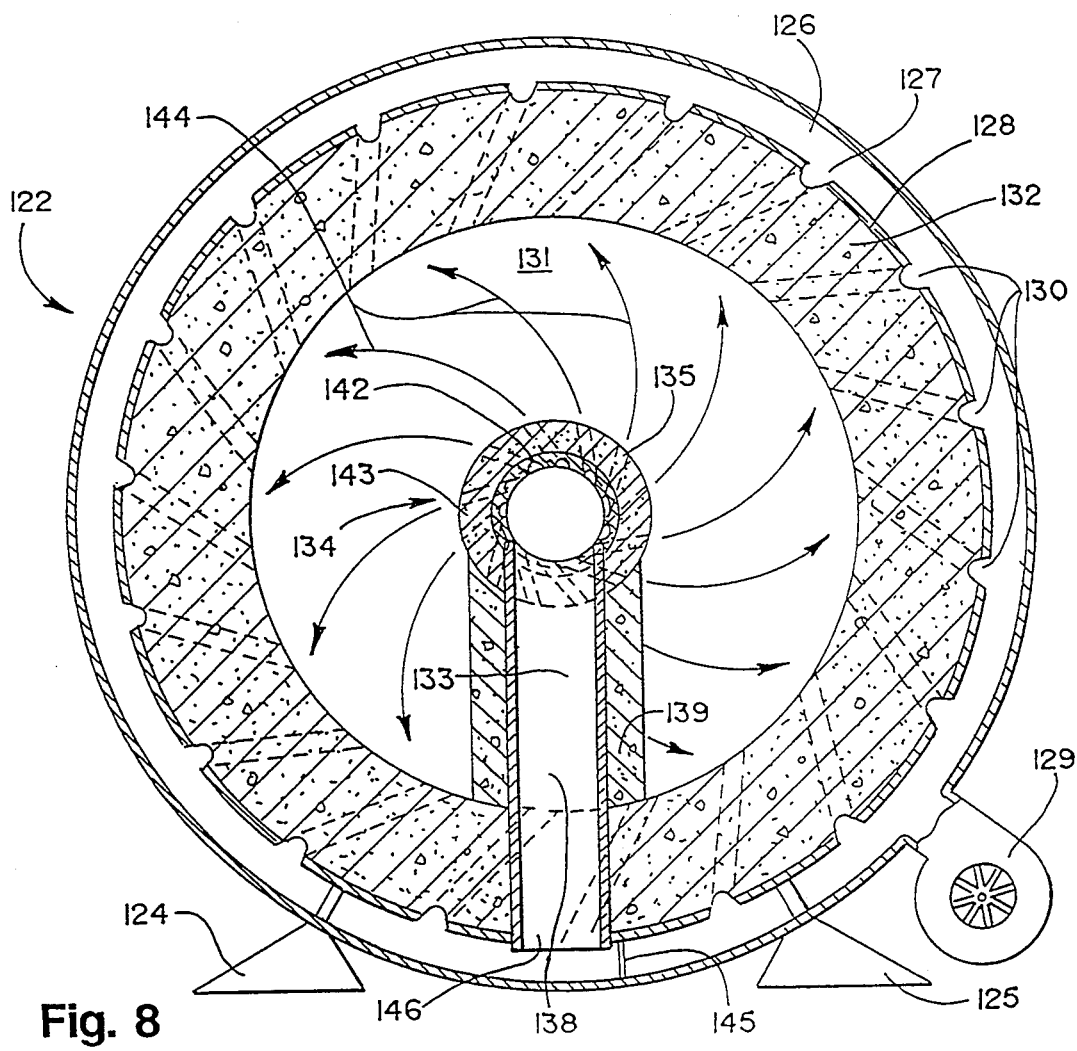

FIG. 8 gives a cross-sectional view of a reburn tunnel having an excitor inside where air enters through both the reburn unit's wall and the excitor's wall.

Figure 9:
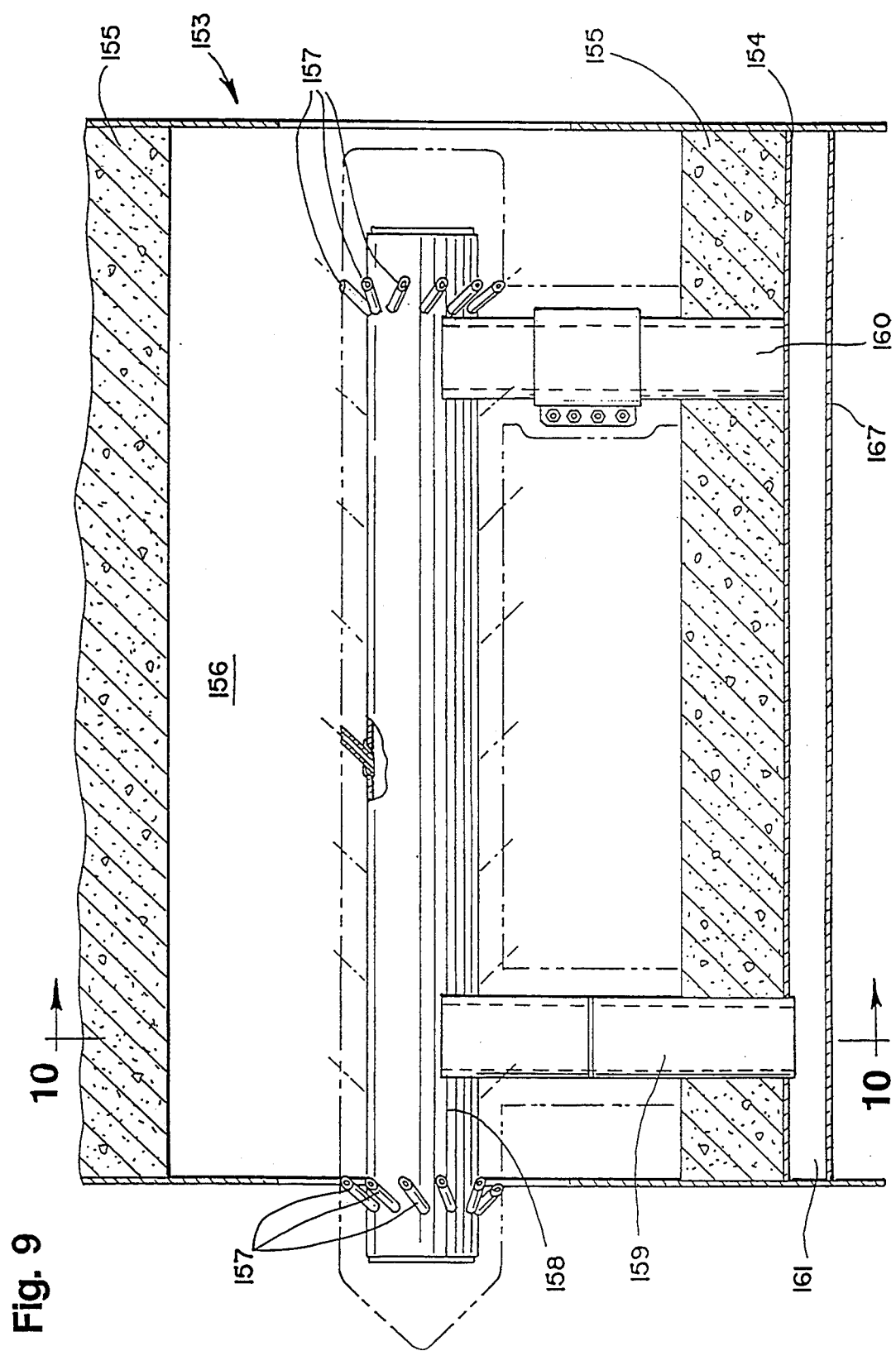

FIG. 9 provides a side cross-sectional view of a portion of a reburn tunnel having an excitor inside in which air enters the reburn tunnel through nozzles placed only on the excitor.

Figure 10:
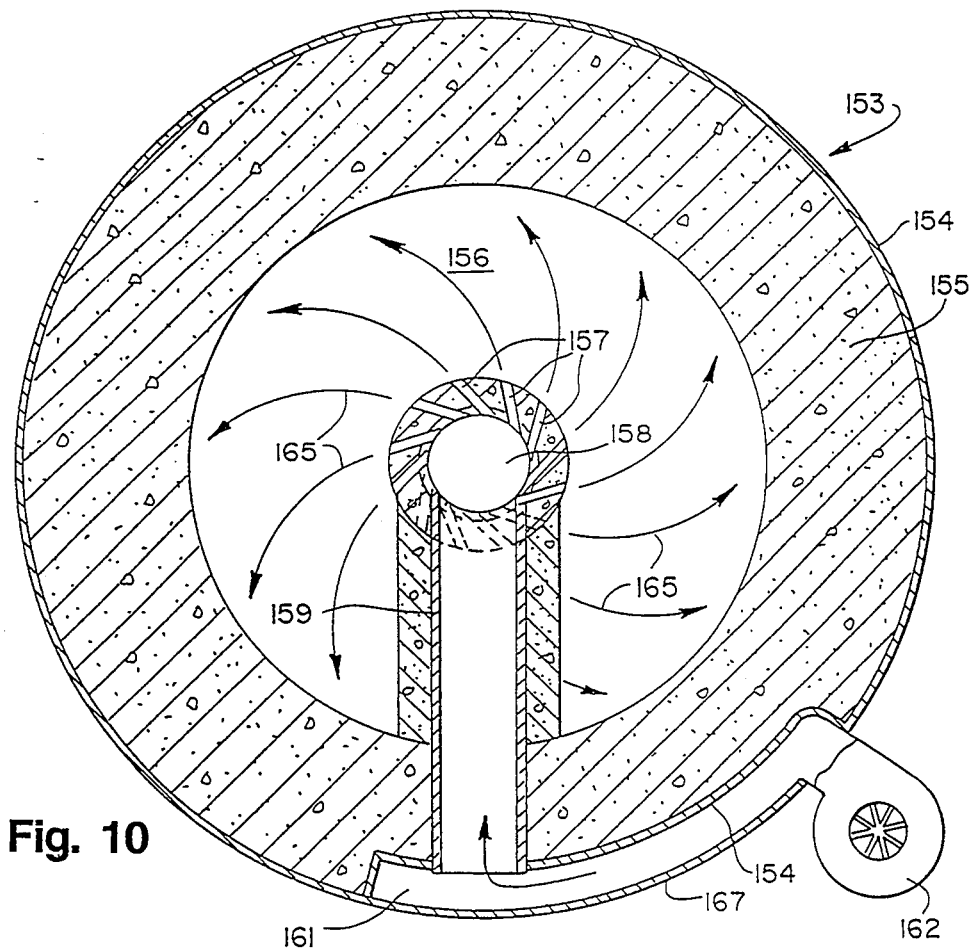

FIG. 10 gives a cross-sectional view along the line 10—10 of the reburn tunnel shown in FIG. 9.

FIGS. 11 to 15 provide diagrammatic cross-sectional views of reburn tunnels with excitors showing, in particular, different techniques for increasing the cross-sectional areas of the reburn tunnels in going from the inlet opening to the outlet opening.

Figure 16:
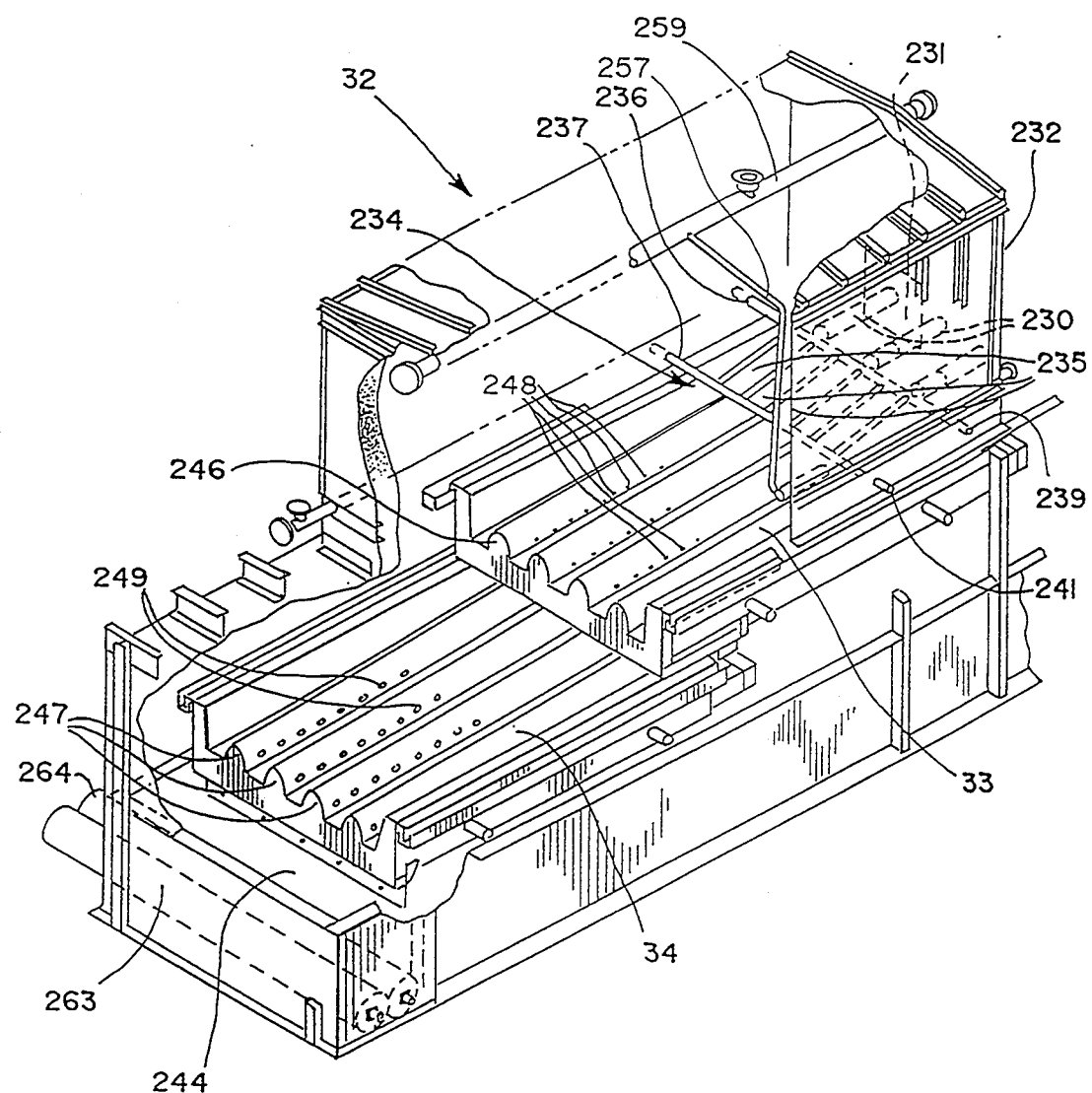

FIG. 16 gives an isometric view, partially in section, of an incinerator main chamber having a grate in the vicinity of the inlet opening to the chamber but located above the chamber's floor.

Figure 17:
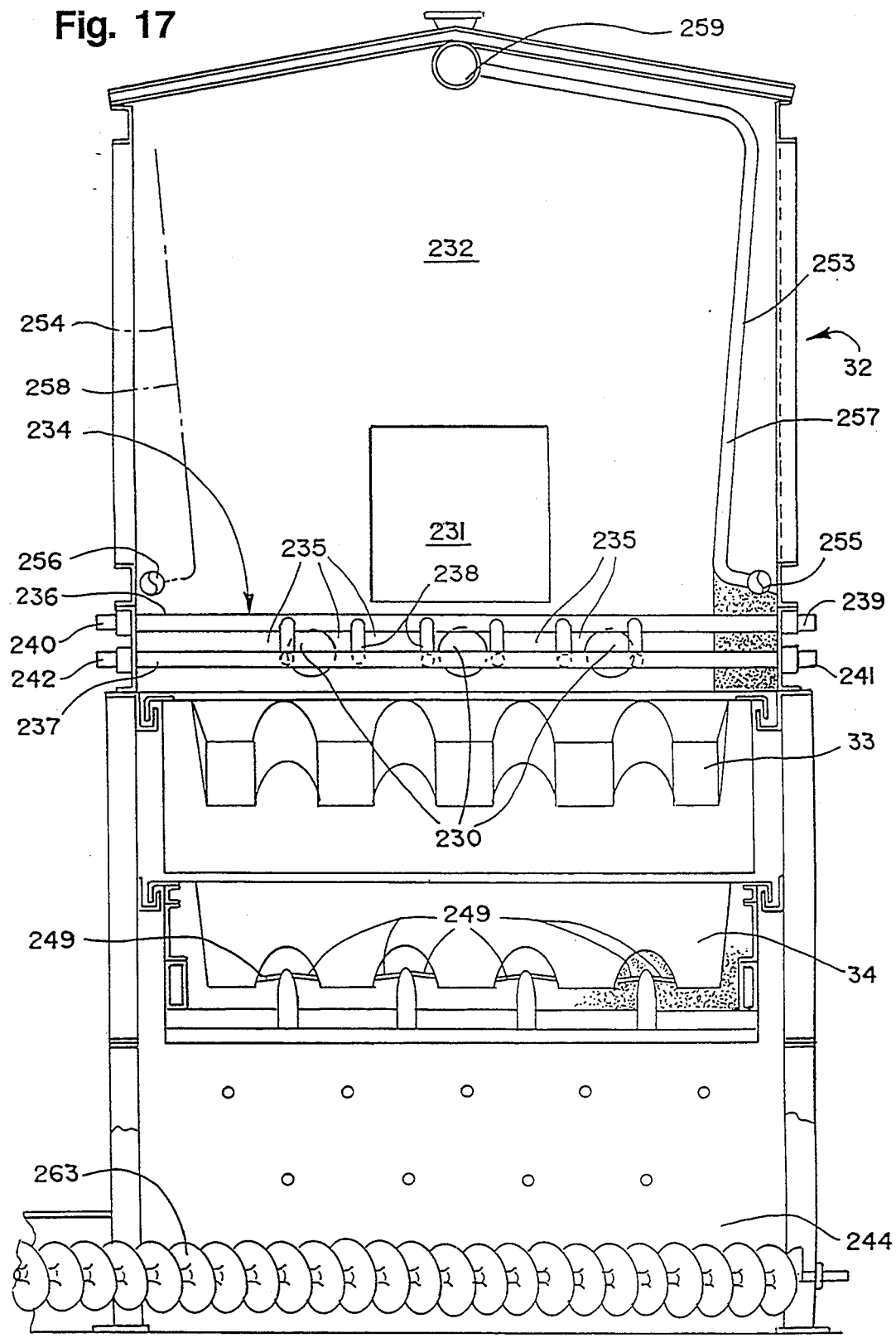

FIG. 17 displays an end view, in cross section, of the incinerator chamber of FIG. 16.

Figure 18:
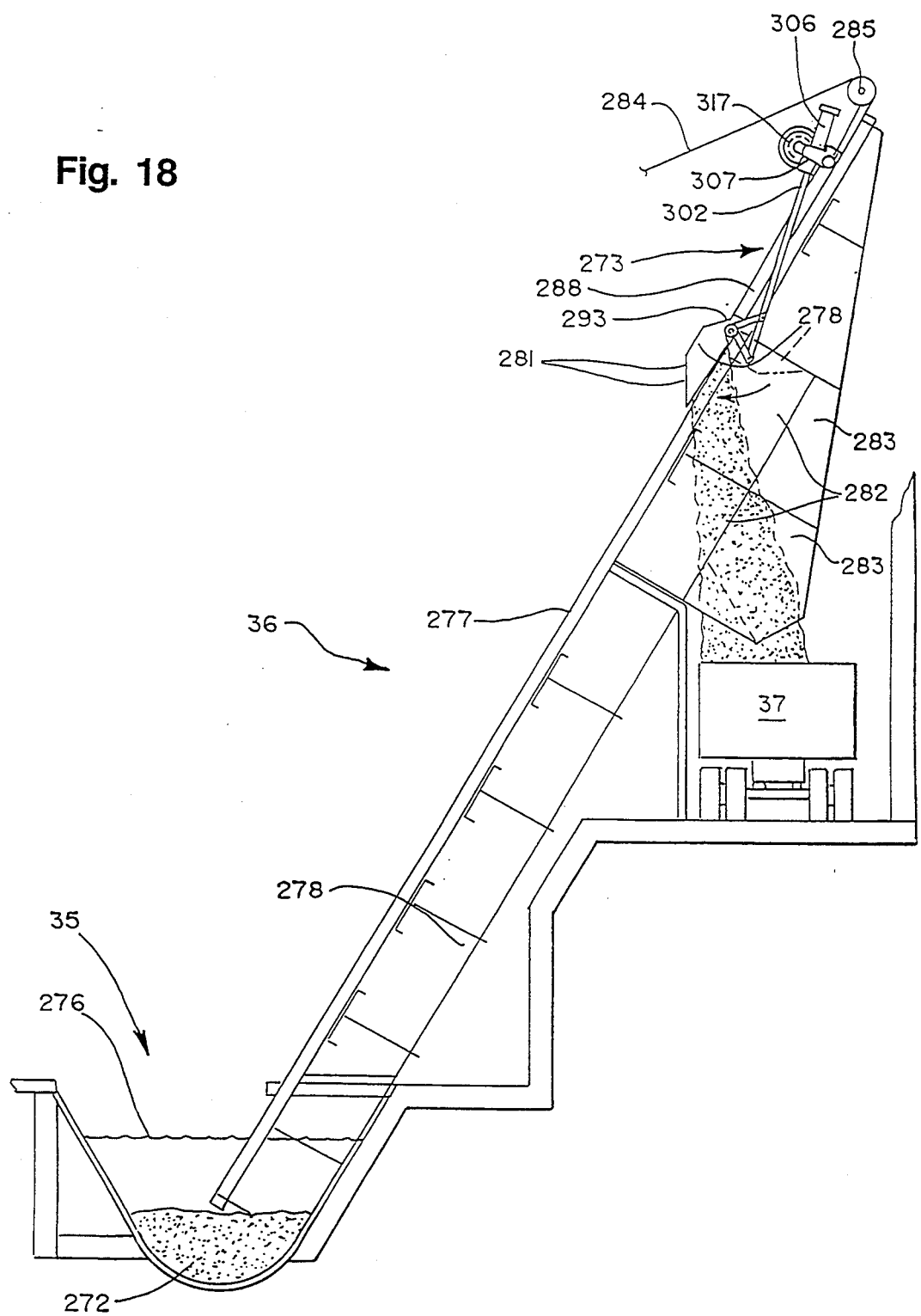

FIG. 18 provides a side elevational view of a scoop mechanism for removing ashes from the output pit of an incinerator system.

FIG. 19 gives a side elevational view of an ash scoop used in the mechanism of FIG. 18.

FIG. 20 displays a top plan of the scoop of FIG. 19.

FIG. 21 gives an end elevational view along the line 21—21 of the track guide of the scoop of FIG. 20.

Figure 22:
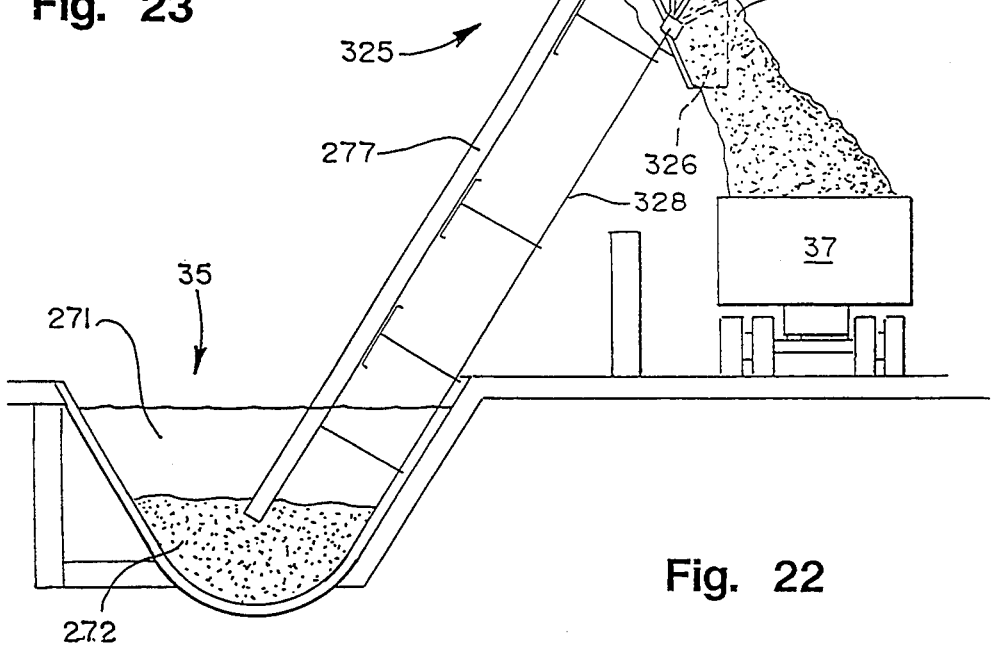

FIG. 22 illustrates a side elevational view of yet a further alternate ash removal mechanism.

Figure 23:
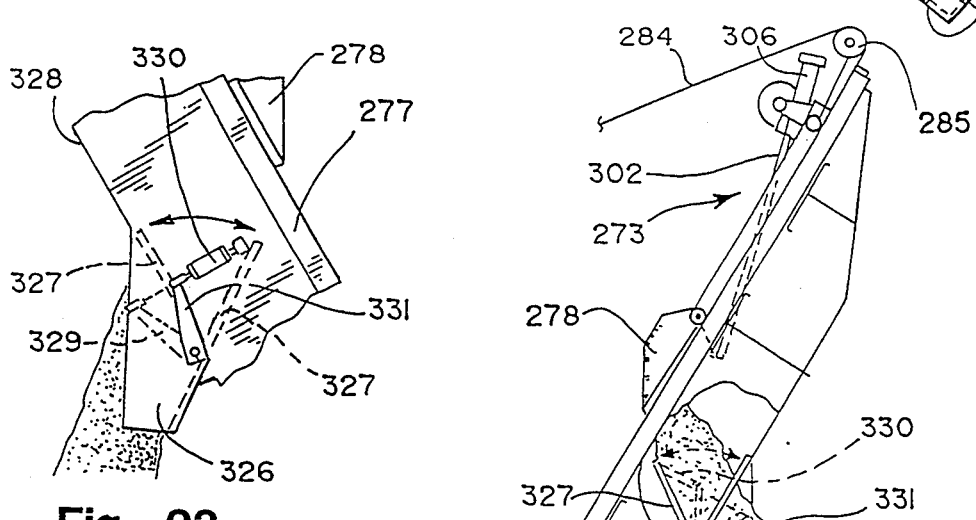

FIG. 23 provides an enlarged view of the chute mechanism shown in FIG. 22.

Figure 24:
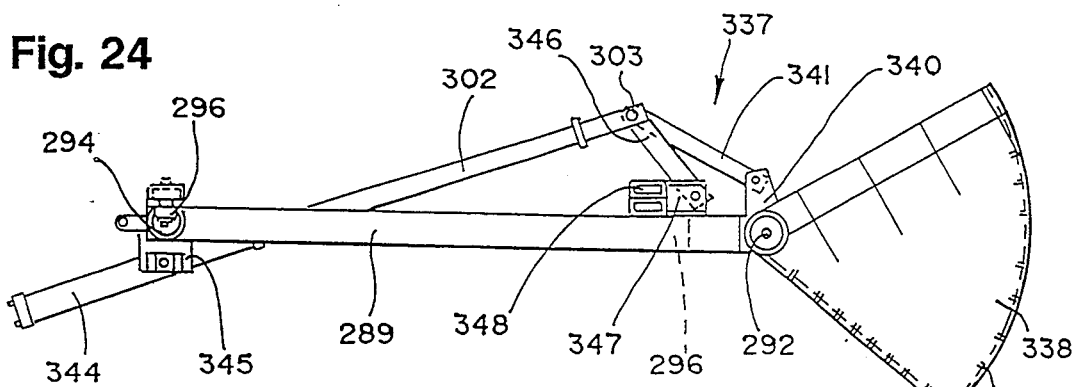

FIG. 24 gives a side elevational view of an alternate ash removal scoop for use in the mechanisms shown in FIGS. 18, 22, and 23.

Figures 25, 26, 27:
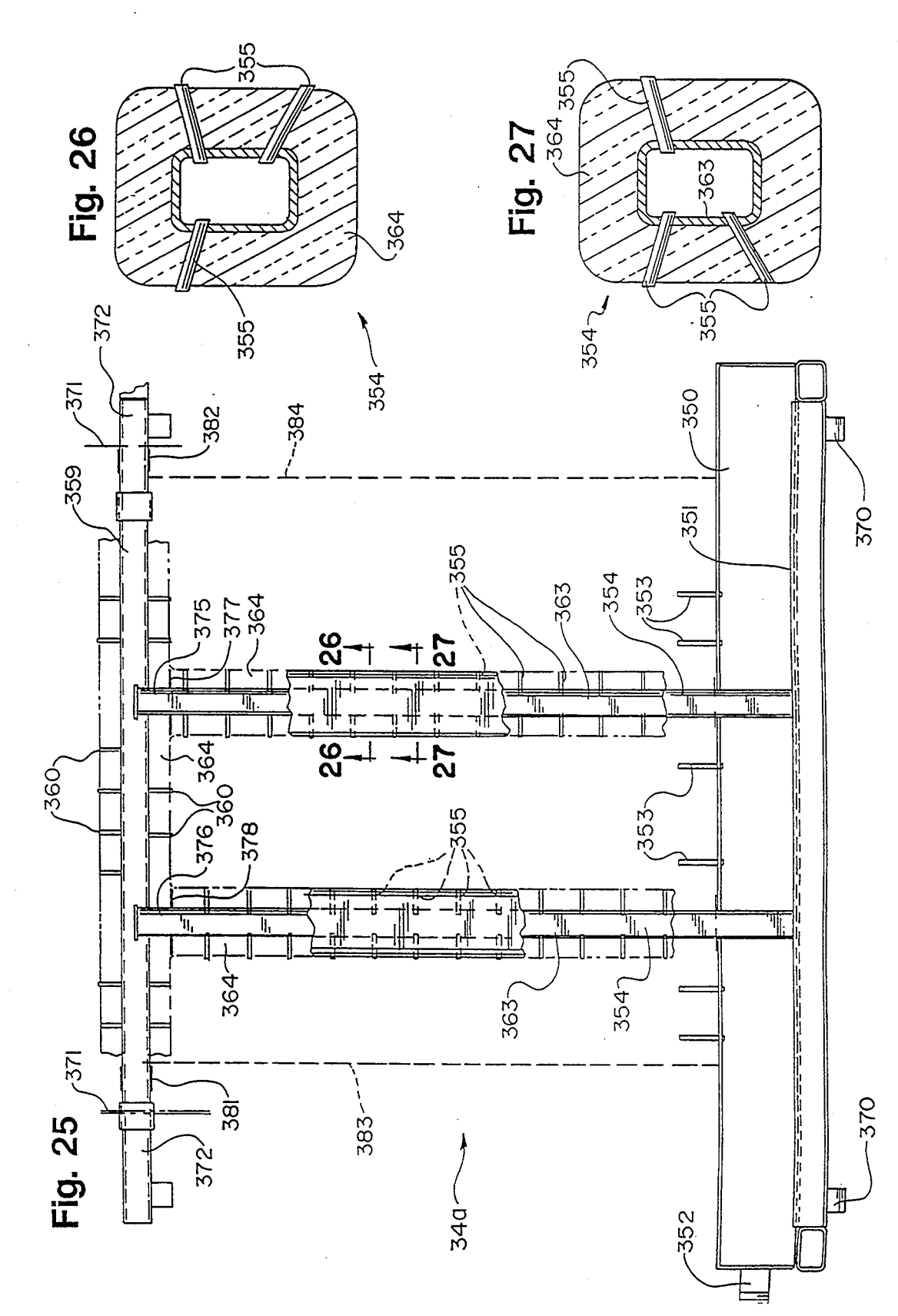

FIG. 25 shows an air grate having hollow passageways through which air travels prior to entering the combustion chamber through attached nozzles.

FIG. 26 gives a cross sectional view along the line 26—26 of the air grate of FIG. 25.

FIG. 27 gives a cross sectional view along the line 27—27 of the air grate of FIG. 27.

FIG. 28 shows a tapered, cantilevered grate through which air passes to cool itself and support combustion.

FIG. 29 provides a cross sectional view along the line 29—29 of the air grate of FIG. 28.

FIG. 30 provides a cross sectional view along the line 30—30 of the air grate of FIG. 28.

Figure 31:
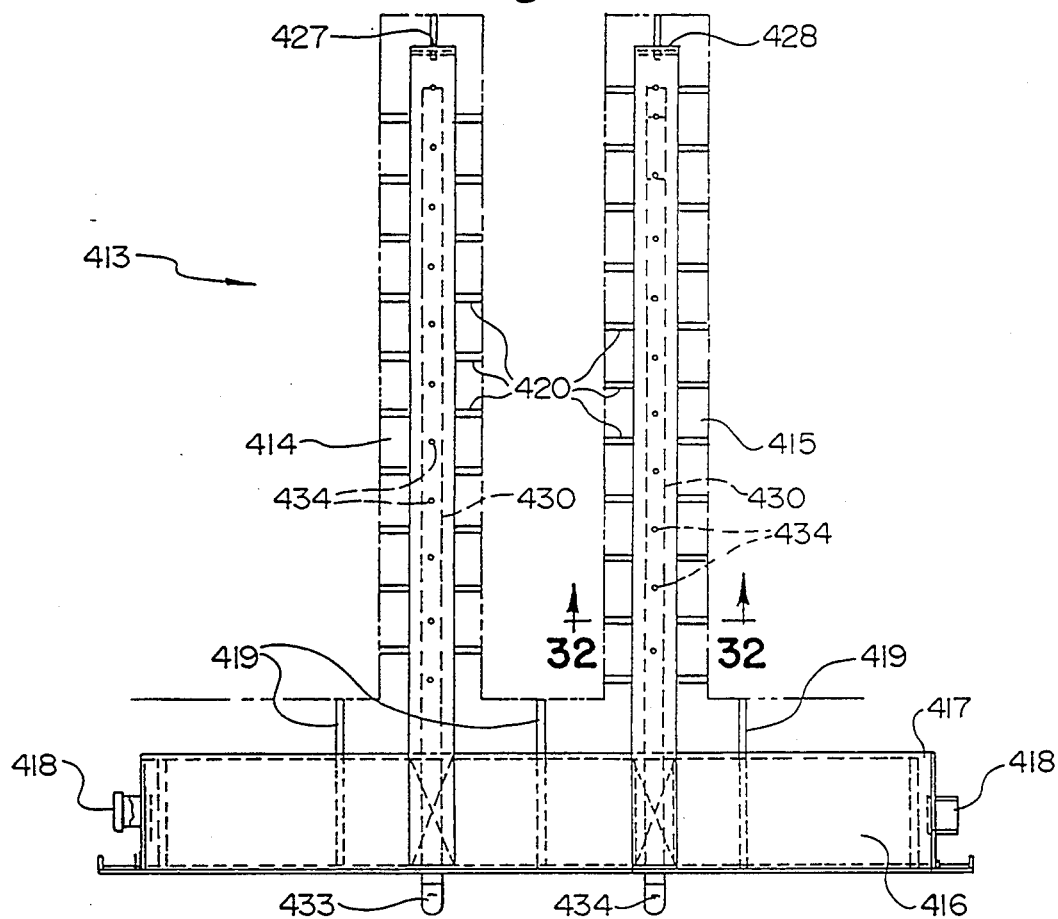

FIG. 31 gives a top plan view of a cantilevered, air grate having a return tube located inside the passageways through which the air travels prior to entering the combustion chamber.

Figure 32:
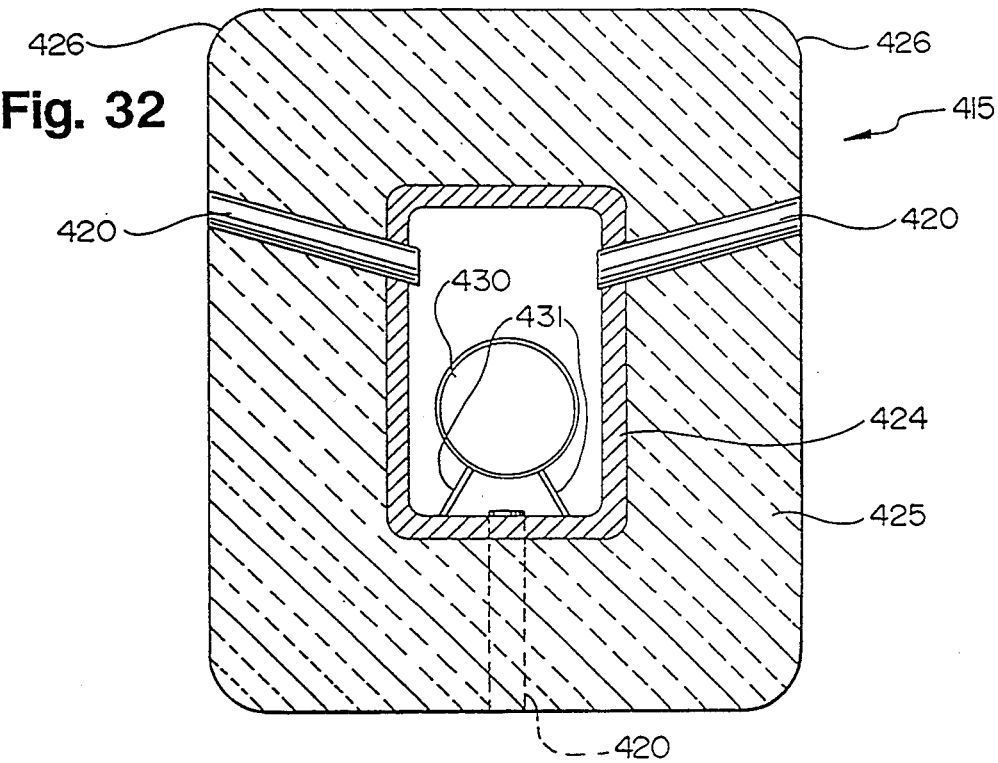

FIG. 32 gives a cross sectional view along the line 32—32 of the air grate of FIG. 31.

Figure 33:
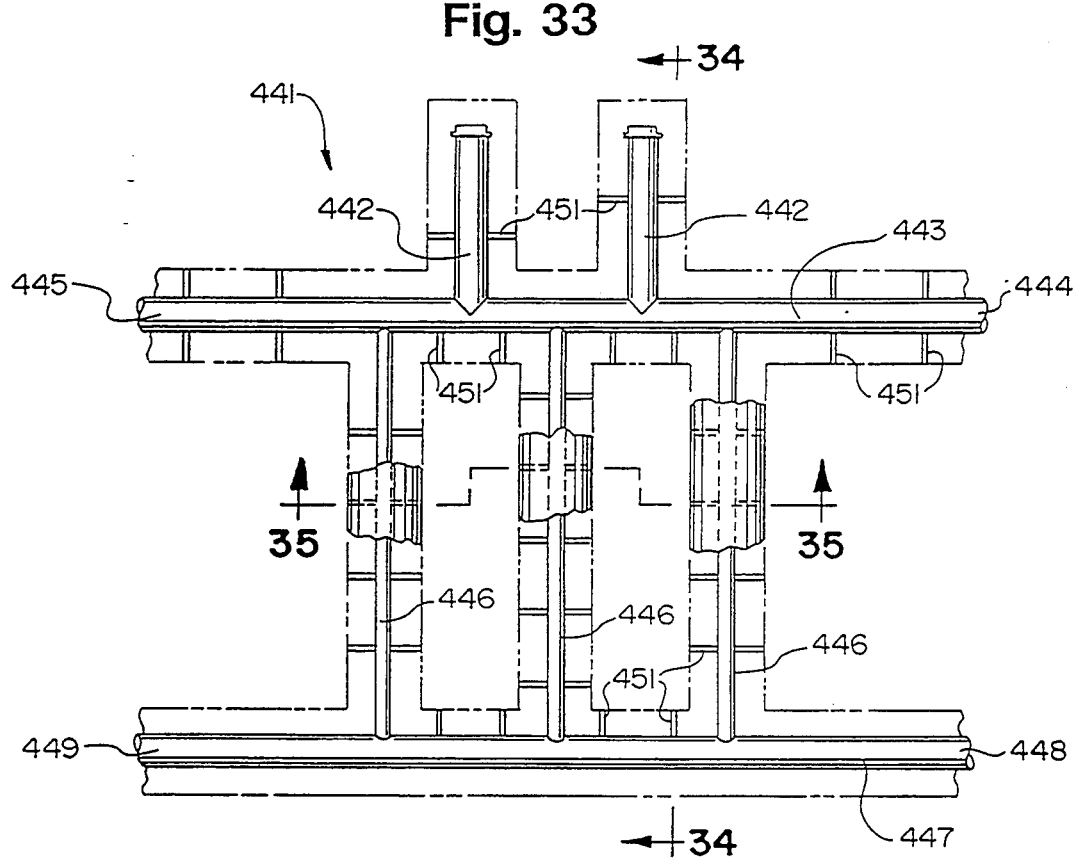

FIG. 33 shows an air-grate having cross-linked arms and permitting the control of the amount and direction of the flow of air to provide the desired quantity of air flow in the combustion chamber itself.

Figure 34:
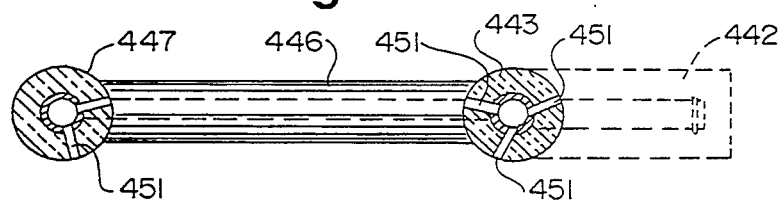

FIG. 34 provides a cross sectional view along the line 34—34 of the air-grate of FIG. 33.

Figure 35:
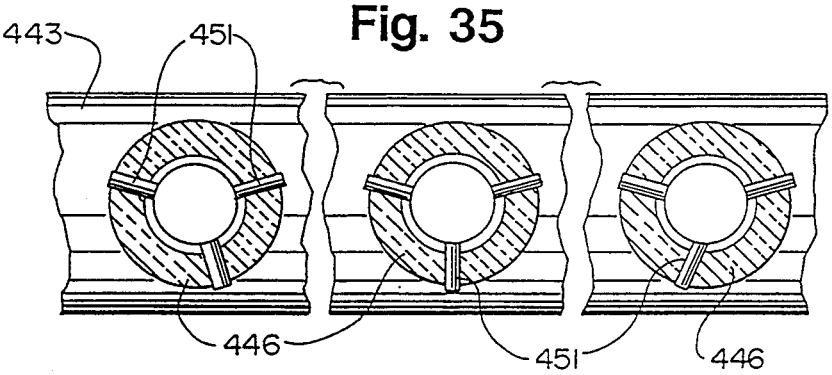

FIG. 35 gives a cross sectional, condensed view along the line 35—35 of the air-grate of FIG. 33.

Figure 36:
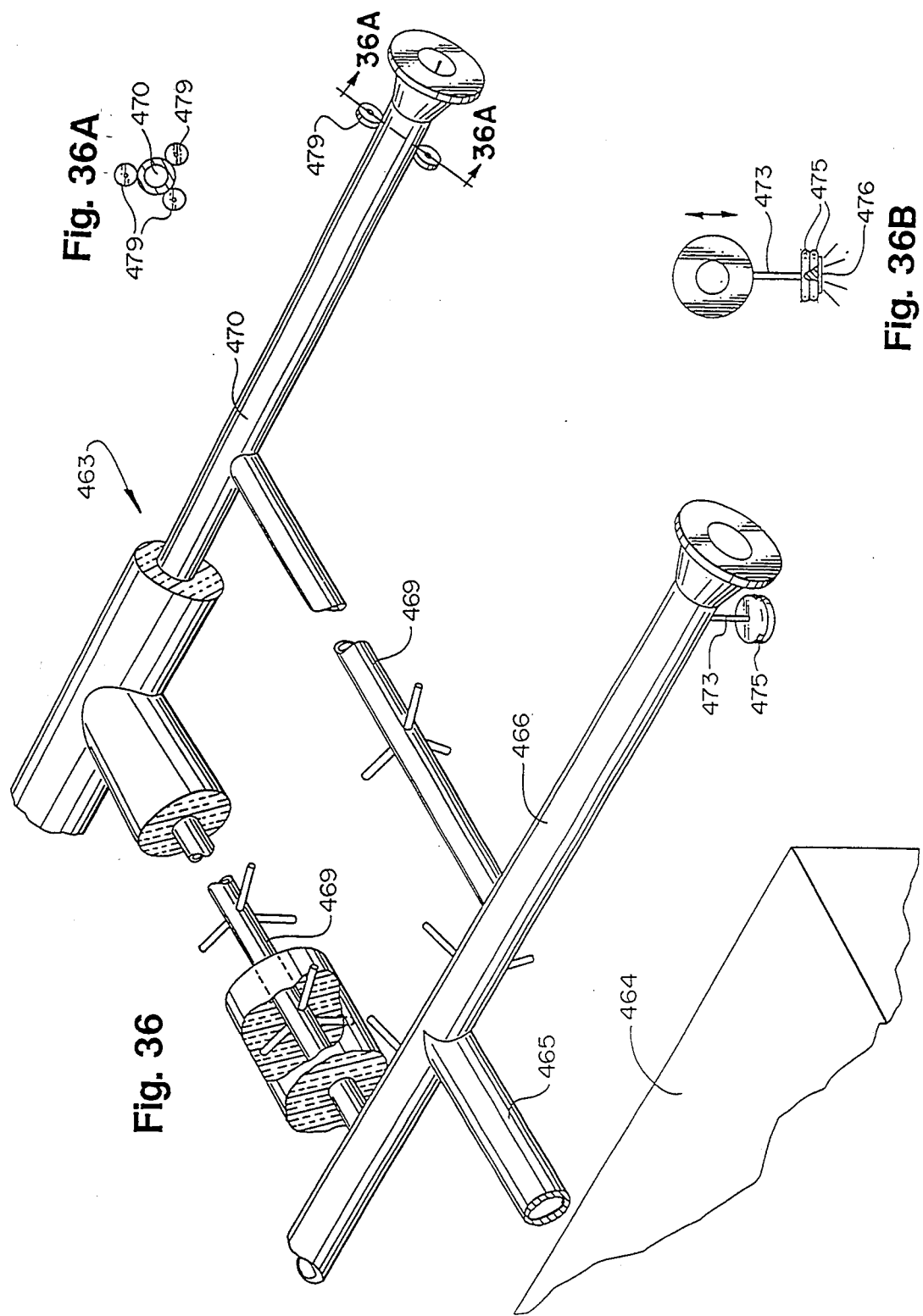

FIG. 36 gives an isometric view of an air-grate which can move to dislodge burning refuse.

FIG. 36a provides a cross sectional view along the line 36a—36a of the air-grate of FIG. 36 showing the pivoting connection of one side of the grate.

FIG. 36b gives a side elevational view of an air bag system for providing motion to the side of the air-grate of FIG. 36 not having the pivoting connection of FIG. 36a.

Figure 37:
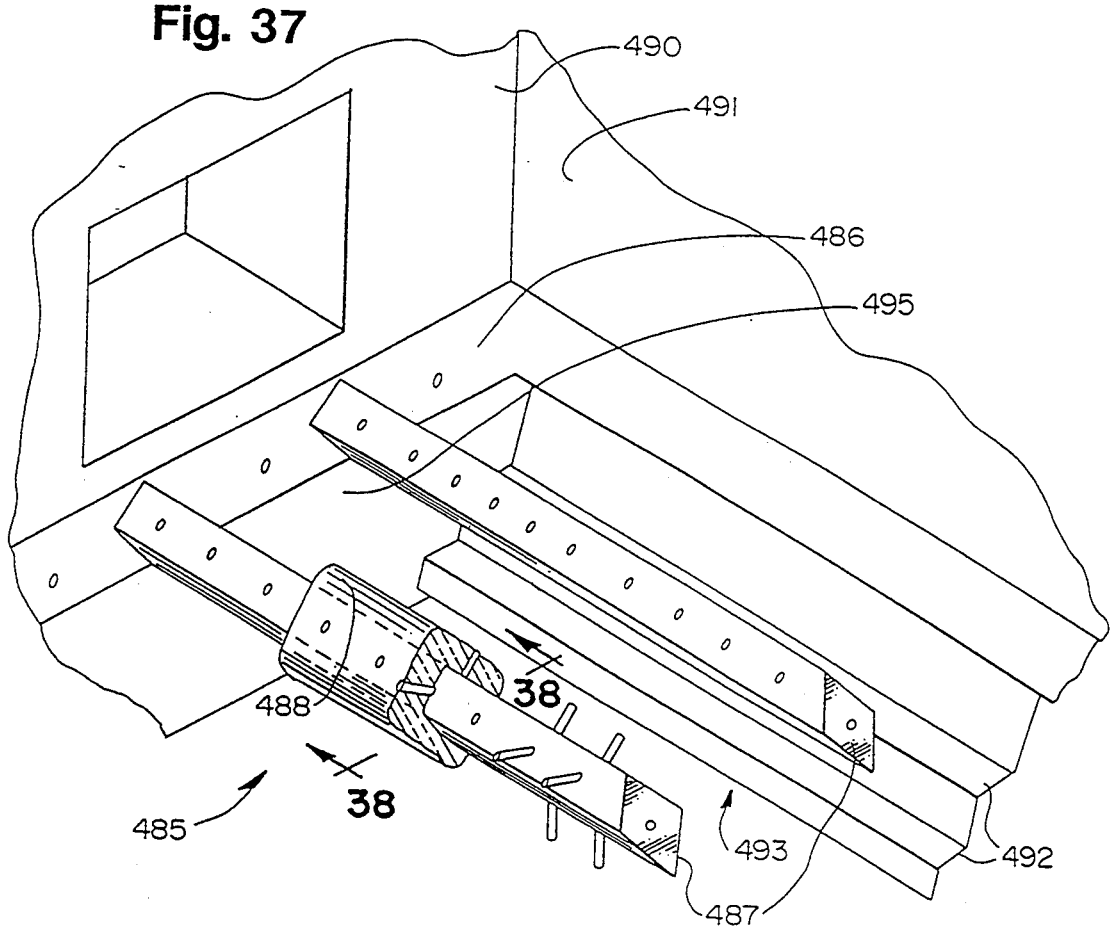

FIG. 37 gives an isometric view of a cantilevered air-grate in which the individual portions have a cross sectional shape of a diamond to accomplish wedging of the burning refuse.

Figure 38:
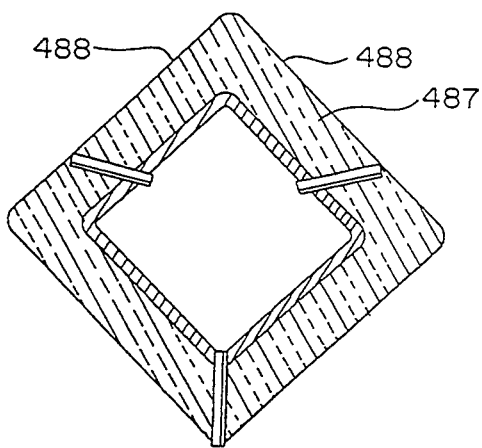

FIG. 38 provides a cross sectional view along the line 38—38 of a portion of the air-grate of FIG. 37.

DETAILED DESCRIPTION

Figure 1:
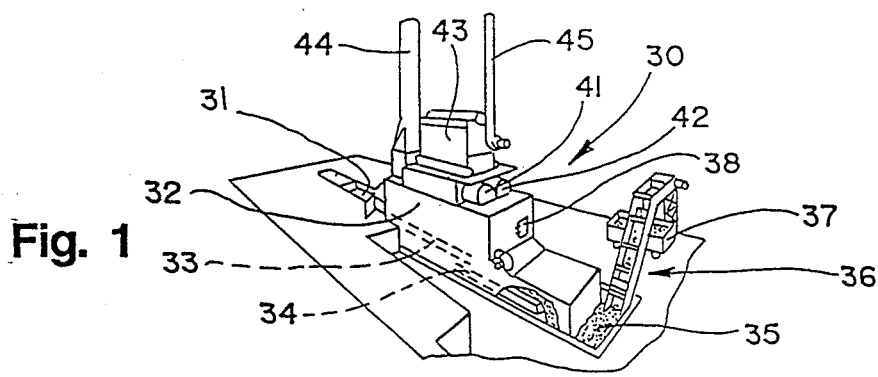

FIG. 1 shows an incinerator system generally at 30. Bulk refuse or hydrocarbon-containing liquids enters the incinerator 30 through the loader 31 and enters the main chamber 32. During most of its stay in the incinerator 30, solid refuse remains upon the pulsating hearth floors 33 and 34. Upon the completion of combustion, the remaining ash falls into the pit 35 where the removal mechanism designated generally at 36 lifts it and places it in the truck 37. The door 38 permits access to the interior of the main chamber 32 for the usual maintenance.

The gases produced by the combustion within the main chamber pass through the dual reburn tunnels 41 and 42 and through the further treating, recirculation, and heat removal stages 43. They eventually leave through the stack 44. Heat recovered from the incinerator system 30 may pass into the pipe 45.

Figure 2:
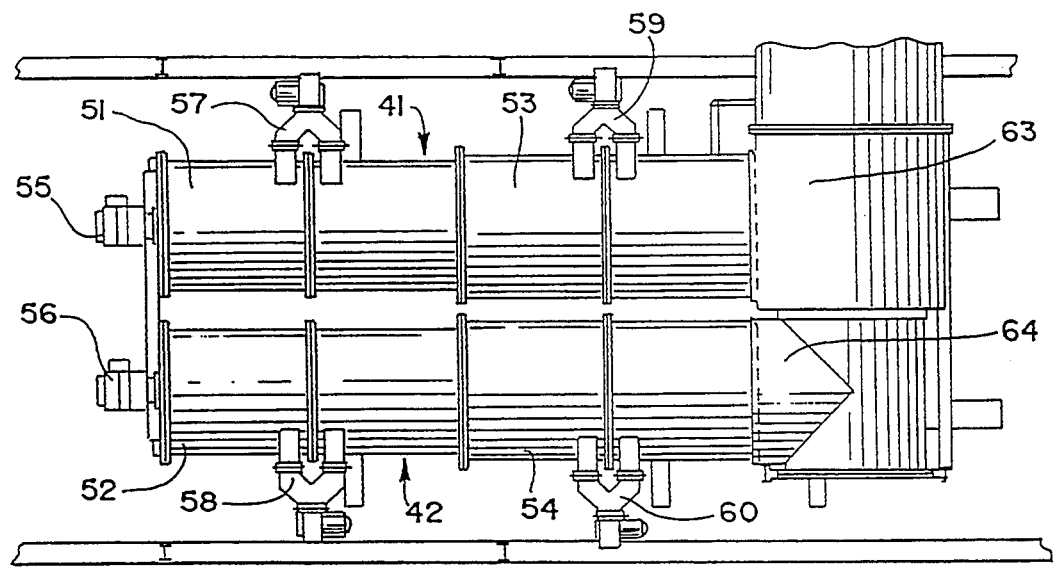
Figure 3:
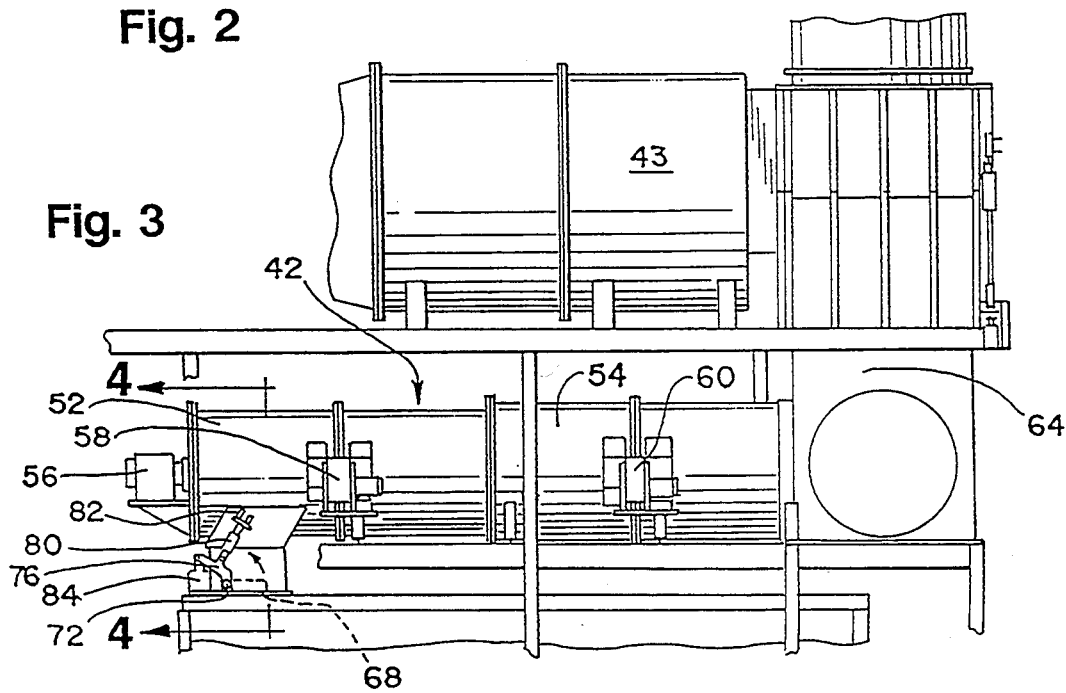

In FIGS. 2 and 3, the reburn tunnels 41 and 42 include the respective first reburn stages 51 and 52 and respective second reburn stages 53 and 54. The burners 55 and 56 at the beginning of the first stages 51 and 52 maintain the temperatures in the tunnels 41 and 42 at the desired levels for proper operation. They also bring the reburn temperatures up to the proper levels at the each commencement of operation. In fact, environmental regulations often require that the incinerator achieve its operating temperatures prior to the introduction of the first amount of refuse whatsoever after a shut-down. The burners 55 and 56 assist in this task.

The blowers 57 and 58 provide air to the first stages 51 and 52 for combustion and the blowers 59 and 60 perform the same function for the second stages 53 and 54. The gases from the second stages 53 and 54 pass through the outlets 63 and 64.

As observed, the second reburn stages 53 and 54 have greater cross-sectional areas than the first reburn stages 51 and 52 of the tunnels 41 and 42, respectively. This allows the second reburn stages 53 and 54 to accommodate the greater volumes of gases resulting from the introduction of air and from the combustion of volitalized hydrocarbons within the tunnels 41 and 42. This represents one method of increasing the volume of the reburn tunnels from their inlets to the outlets. Other techniques accomplishing the same objective receive discussion below with reference to FIGS. 11 to 15.

After leaving the second stages 53 and 54, the gases then pass to the subsequent treating section 43 and mentioned above.

Figure 4:
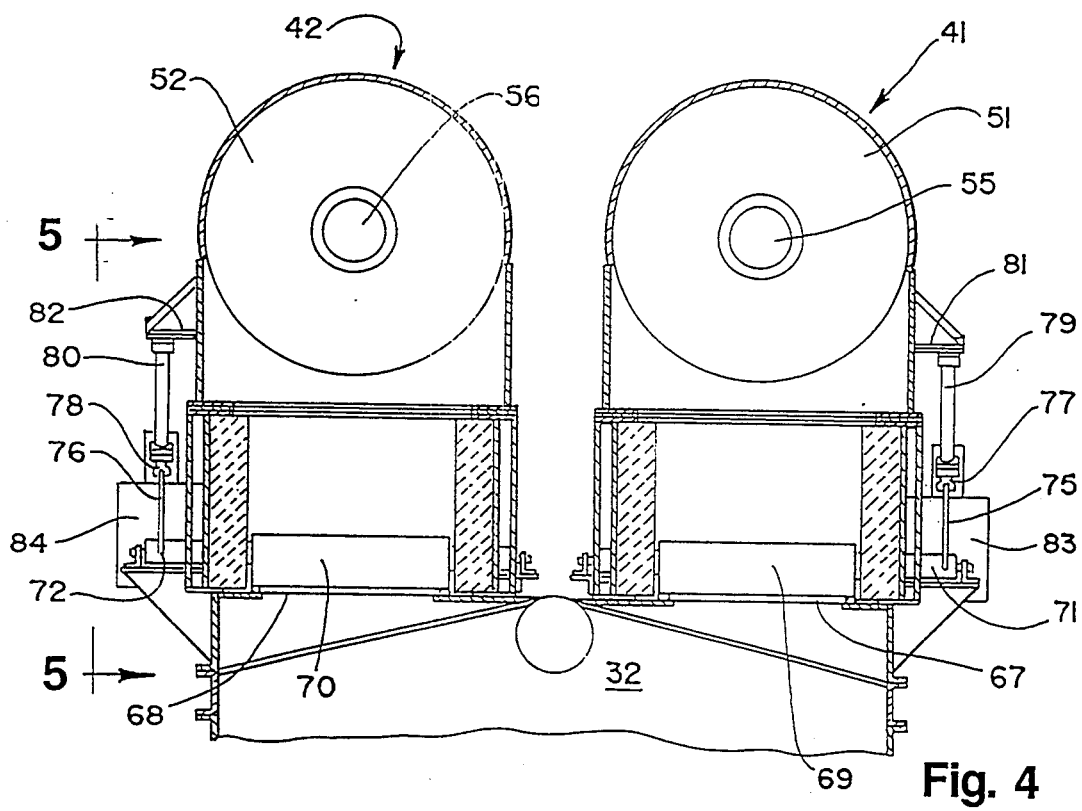
Figure 5:
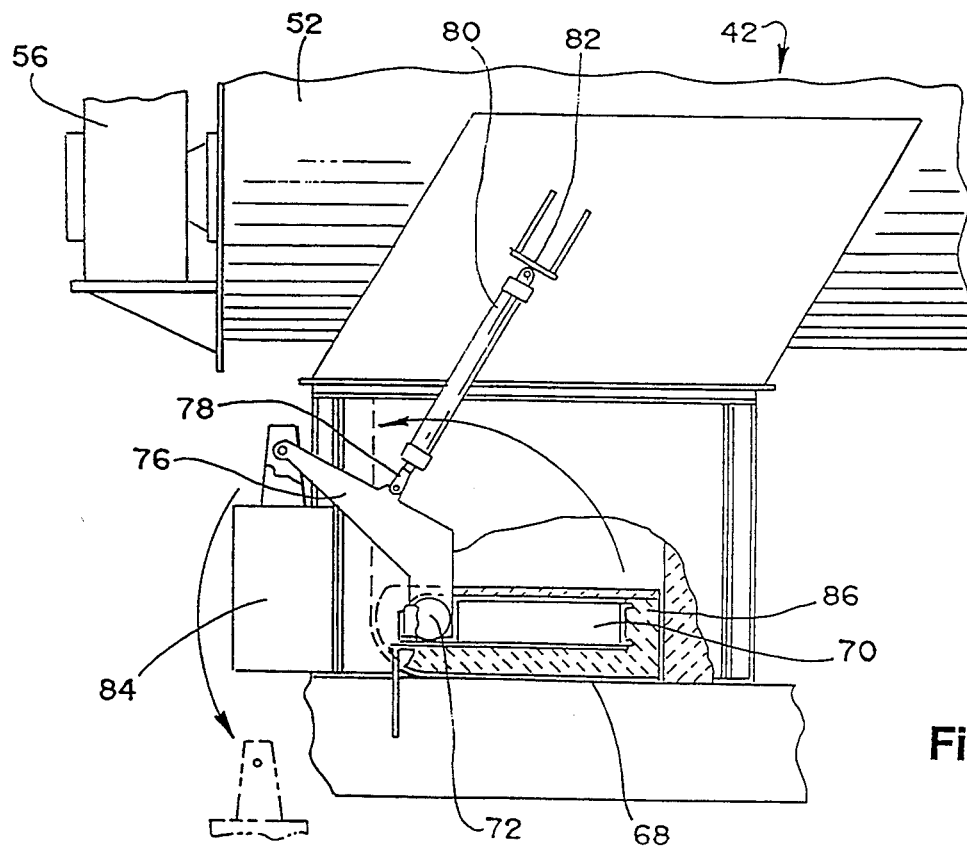

As seen in FIGS. 4 and 5, the gases from the main chamber 32 pass through the outlet openings 67 and 68 which also form the inlet openings to the reburn units 41 and 42, respectively. The dampers 69 and 70, when in the positions shown in FIGS. 3 to 5, cover the opening 67 and 68, respectively, and close them off. In operation, of course, at least one of the dampers 69 and 70 will remain open. When the main chamber 32 has sufficient combustible material inside, both will open and allow the gases to pass through to the reburn tunnels 41 and 42.

To accomplish their motion, the dampers 69 and 70 include the axial extensions 71 and 72. The lever arms 75 and 76 then connect ridgedly to the extensions 71 and 72. The rods 77 and 78 connect the lever arms 75 and 76 to the pistons 79 and 80 which attach ridgedly at their other ends to the brackets 81 and 82. The extension of the pistons 79 and 80 in FIGS. 3 to 5, especially the last, will induce the rotation of the lever arm 76 and its counterpart not shown about the center of the axis 72 to result in the opening of the dampers 69 and 70.

The counterweights 83 and 84 rotationally coupled to the other ends of the lever arms 75 and 76. They counterbalance the weight of the dampers 69 and 70 and facilitate their controlled motion.

A significant part of the weight of the dampers 69 and 70 results from their having a covering of the refractory 86 as shown in FIG. 5. This, of course, provides protection against the high temperatures and corrosiveness of the gases passing around them.

To help further protect the damper 69 and 70, they include air channels as discussed below with reference to FIG. 7. The passage of air through the dampers 69 and 70 keeps them at a low enough temperature to prevent their destruction.

Figure 6:
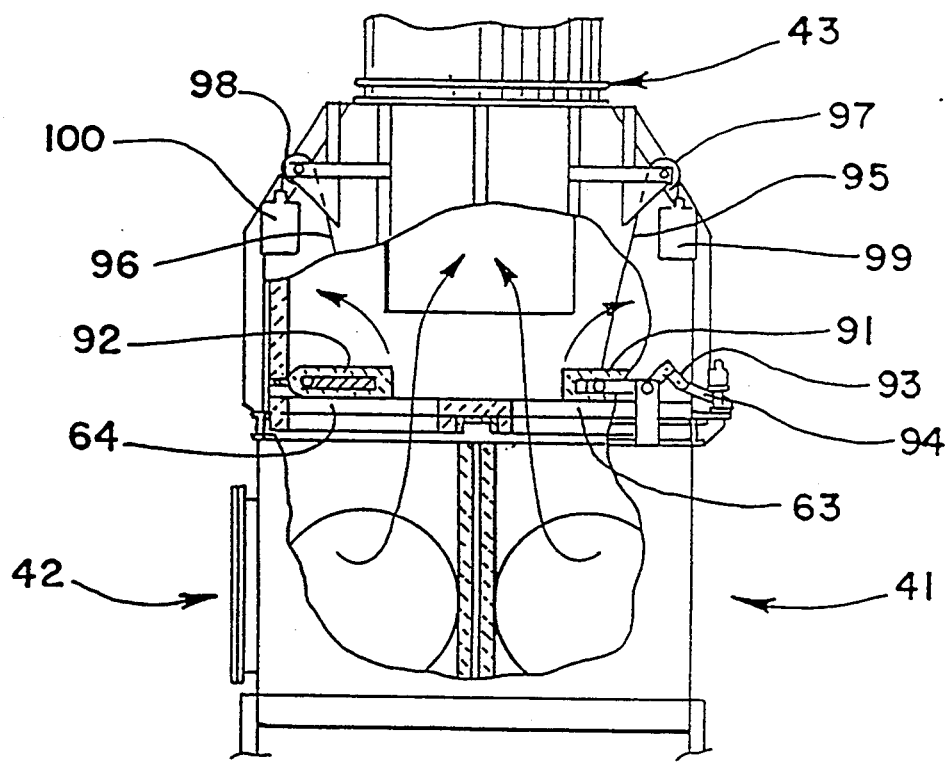
FIG. 6 shows the outlet openings of the twin reburn tunnels and the choke dampers which can partially close each of the outlet openings.

Similarly, the dampers 91 and 92 cover the outlet opening 63 and 64 of the reburn tunnels 41 and 42, respectively. As shown in FIG. 6, however, the dampers 91 and 92, even when in the closed position as shown there, only cover up to about a maximum of about 60 percent of the outlet opening 63 and 64. When closed, they retain the gases within the reburn tunnels 41 and 42 for a longer time to assure their complete combustion. Typically such retention becomes desirable when the tunnels 41 and 42, and often, the main chamber 32, operate upon substantially less than the maximum amount of refuse or combustion gases than the system can handle.

The dampers 91 and 92 operate independently of each other depending upon the conditions in the respective reburn tunnels 41 and 42. They may, for example, submit to the control of temperature sensors placed within their respective tunnels. A lowering temperature may indicate the need to close the appropriate damper to retain the heat within the respective tunnel. Alternately, when the incinerator system produces steam, the damper control may measure the steam pressure produced by the system. A declining steam pressure may indicate a smaller quantity of heat within the system. This would provide an indication that either or both of the dampers 91 and 92 should close at least to some extent.

The dampers 91 and 92 in FIG. 6 not only have the totally open or totally closed positions. They may also occupy intermediary locations to effectively block the outputs 63 and 64 by an amount less than the maximum closure that the dampers can achieve.

The movement of the damper 91 appears in FIG. 6 under the action of the lever arm 93 connected to the piston 94 which effectuates the desired movement between opening and closing. The cable 95 attaches to the damper 91, passes over the pulley 97 and connects to the weight 99 to counterbalance the weight of the damper 91. Only the cable 96, the pulley 98, and the weight 100 appear in FIG. 6 for the tunnel 42.

The choke dampers 91 and 92 serve to retain the gas within the reburn tunnels 41 and 42 for a greater period of time. In other words, it slows down the passage of the gas through these chambers. To achieve the desired combustion, the gas speed should typically not exceed about 55 feet per second. To assure proper combustion, the gas should move no faster than about 46 feet per second.

The dampers 91 and 92, as shown, take the form of rectangular blocks that pivot to open and close. Alternately, as square blocks, they may slide sideways into the position where they partially close the outlet openings 63 and 64. They reopen them by sliding sideways in the opposite direction. In fact, they may even slide through an opening in the exterior wall of the incinerator system for this purpose.

As a further alternate, the choke dampers at the ends of the reburn tunnels 41 and 42 may take the form of butterfly valves. This would give them either a round or rectangular configuration located within the outlets of the reburn units. They would then pivot about their centers to partially close or open the reburn's outlets. In the latter configuration, they would remain within the opening but present their edges of minimal area to avoid substantial interference with the passage of the gases.

Figure 7:
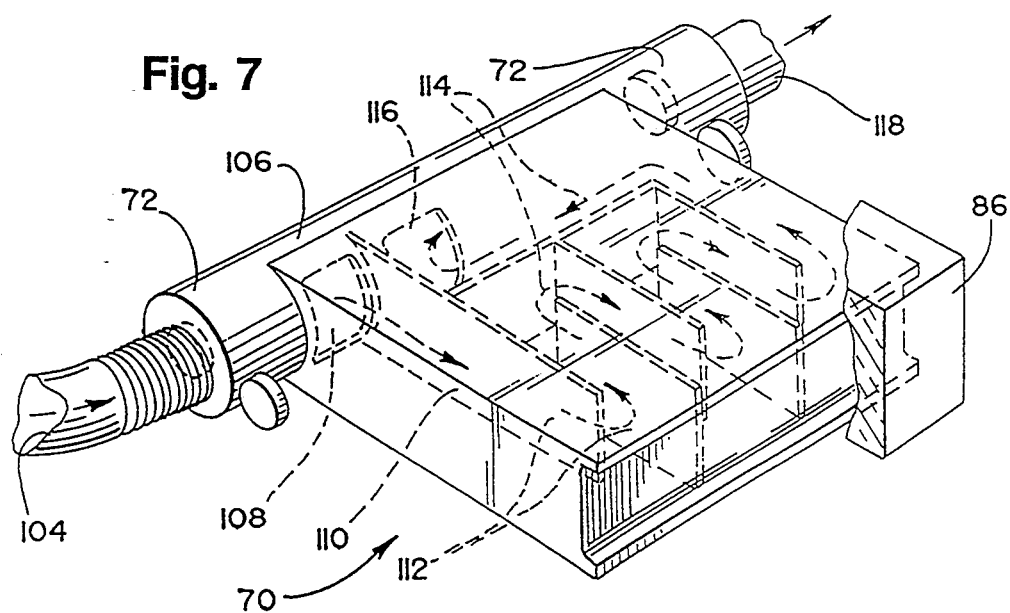
FIG. 7 illustrates a damper that can serve to close off the inlet opening to either the twin reburn tunnels or partially block the outlet openings.

FIG. 7 shows a typical damper, for example, the closure 70 to the outlet opening 68 to the second reburn tunnel 42 seen in FIG. 5. In FIG. 7, a supply of air passes through the damper 70 to keep its temperature from rising to a point where it could suffer serious damage from the heated environment from which it operates. As seen from FIG. 5, the ends of the axial extensions 72 sit on the outside of the tunnel 42.

The extensions 72 have hollow interiors which permits the passage of gas through them. To provide the cool gas, the flexible tube 104 connects to the nearer axial extension 74 to provide a source of cool gas. The cool gas travels through the interior of extension 72 into the axis 106 and out the opening 108 into the chamber 110. It then follows a path created by the dividers 112 and indicated by the arrows 114. Eventually it reaches the opening 116 in the axis 106 where it passes out through the other axial extension 72 and in it to the flexible tube 118.

FIG. 18 shows a reburn tunnel generally at 123 which may serve as either of the sections 51 or 53 of the reburn tunnel 41 or the sections 52 and 54 of the reburn tunnel 42. The tunnel 123 sits generally on the supports 124 and 125. The outer skin 126 surrounds the tunnel 123 and forms the plenum 127 in conjunction with the wall 128. The blower 129 places air in the plenum 127 under pressure. From there, the air may pass through the nozzles 130 which take it into the interior 131 of the reburn tunnel 123. The refractory 132 covers the interior wall 128 and the nozzles 130 to protect them from the heat and the corrosive environment of the interior 131 of the tunnel 123. Additionally, the air within the plenum 127 may pass through the support 133 and into the excitor 134 located in the tunnel's interior 131. From there it passes through the nozzles 135 and into the interior 131 where it helps support combustion.

The support 133 itself includes the inner wall 138 generally having a metalic composition. The refractory 139 surrounds the wall 138 to protect it from the tunnel's environment. Conveniently, the support 133 may have a rectangular cross section on planes parallel to the surface on which the tunnel sits. This will provide it with maximum cross-sectional area for the amount of the interference in the gas flow in the tunnel that it creates.

Similarly, the excitor 134 protects its inner metal wall 142 from corrosion and heat damage with the refractory covering 143. The nozzles 135 pass through the refractory 143.

As seen in FIG. 8, air leaving the nozzles 135 does so with a tangential component of velocity. In other words, the nozzles 135 make an angle with the radii from the center of the excitor 134. Forty five degrees represents a desirable angle.

The gas emanating from the nozzles 135 with the tangential component of velocity follows the path generally shown by the arrows 144. This tangential movement of the air causes it to efficiently and effectively mix with the combustible gases contained in the tunnel's interior 131. Further, the nozzles 135 as well as the outer nozzles 130, will generally introduce the air with an axial component of velocity. In other words, the nozzles point downstream. The velocity of the gases leaving the nozzles may in fact make a 45 degree relative to the axial, or downstream, direction.

Additionally, the nozzles 135 may appear on the excitor 134 in rows in passing from the inlet to the outlet. To further assist the creation of the desired turbulence within the interior 131, the nozzles may have a staggered configuration from row to row to provide a more even air supply and turbulence.

The construction shown in FIG. 18 may undergo modifications for different purposes. Thus, plugging the nozzles 130 will result in all of the air from the plenum 127 passing around the wall 128, through the support 133, into the excitor 134, and out of the nozzles 135 into the tunnel's interior 131. This appears to have a beneficial effect in creating the turbulence necessary for combustion.

Additionally, placing a barrier at the location 145 between the outer wall 126 and the plenum wall 128 will cause the air from the blower 129 to pass around substantially all of the plenum 127 before it reaches the inlet 146 to the support 133. This will have the effect of cooling the wall 128 with the air prior to its introduction into the interior 131. Furthermore, warming the air helps maintain the temperature inside the tunnel 123 at the necessary levels for combustion.

Alternately, the excitor 134 may have no nozzles on it whatsoever. In this eventuality, all the air entering the tunnel's interior 131 will pass through the nozzles 130 on the reburn unit 123 itself. Nonetheless, the excitor must still have some air passing through it from one support to the other. This provides a cooling effect to prevent the heat within the reburn tunnel 123 from destroying the excitor 134.

With or without nozzles, the excitor 134 serves additional purposes. The heat created within the interior 131 of the tunnel 123 itself helps to support the combustion of the gases inside. The heat near the middle of the interior 131 will pass into the refractory surface 143 of the excitor 134. From there it will radiate back into the interior 131 where it will help excite combustion.

To provide the reradiation of heat absorbed, the wall of the excitor 134 should permit very little of the heat to pass through. Thus, it should have a low thermal conductivity constant k, generally less than about 60. Preferably, the conductivity constant k, as defined above, will not exceed about 24.

Furthermore, the air entering the interior 131 must create turbulence in order to accomplish combustion. The excitor 134 reduces the maximum dimension of the space in the interior of the tunnel 123. Thus, air entering the interior 131 has a much shorter distance to travel to reach the combustible gasses. Thus it can more effectively create the required turbulence for combustion because of the presence of the excitor 134.

Desirably, the space between the outer surface of the refractory 143 of the excitor 134 and the inner surface of the refractory 132 covering the outer wall 128 should remain constant all around the excitor 134. This permits the most efficient mixing and turbulence of the oxygen introduced into the tunnel's interior 131. In the case of a circular reburn tunnel as shown in FIG. 18, this would result in the interior 131 assuming an annular configuration.

In the case of an incinerator system with a single reburn tunnel, a single excitor would obviously suffice. For a system having twin reburn tunnels as shown in FIGS. 1 to 6, either or both of the tunnels may include an excitor. The latter, of course, represents the most desired configuration.

FIG. 9 shows generally a portion of a reburn tunnel 153 which may, in fact, represent part of either of the reburn tunnels 41 or 42. The outer wall 154 includes the refractory covering 155 but no nozzles passing through it. Rather, all of the air entering the interior 156 of the tunnel 153 passes through the nozzles 157 on the excitor 158. That air, as before, enters the excitor 158 through its supports 159 and 160 and, eventually from the plenum 161. As seen in FIG. 10, the blower 162 provides the air under pressure which eventually passes through the nozzles 157 into the interior 156.

As before, the nozzles 157 introduce the air with an axial component of velocity. Stated in other words, the air is introduced at least partially in the direction from the inlet of the reburn section 153 to the outlet, or in the direction from the first support 159 towards the second support 160. As in FIG. 9, that angle generally amounts to about 45 degrees.

Furthermore, as shown in both FIGS. 9 and 10, the nozzles impart a tangential as well as a radial component of velocity to the air passing through them. Again, the nozzles will introduce the air at an angle of about 45 degrees relative to the radial direction. Thus, half of the nonaxial velocity of the gases will move them outward and the other half moves them around the interior 156. The result appears in FIG. 10 where the arrows 166 show the general vorticity to the direction of movement of the air.

Figure 11:
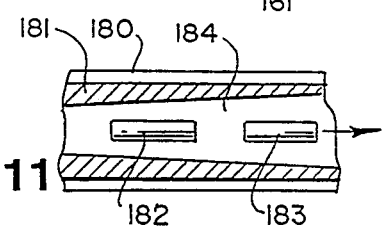

The plenum 161 does not extend the entire circumference of the reburn tunnel 153. Rather, it only goes from the blower 162 to the support 159. The outer wall 167, along with the wall 154 attached to the refractory 155, creates the plenum 161. FIG. 11 gives a diagram of a section of a reburn tunnel having the outer wall 180, the refractory 181 and the two excitor sections 182 and 183. The arrow indicates the direction of the gas movement as in FIGS. 12 to 15. The excitors 182 and 183 have the same, constant cross-sectional area. However, the cross-sectional area of the interior 184 increases in the direction of the gas movement because the refractory wall 181 slopes outward. This permits the reburn section to accommodate the increasing amounts of air introduced either through the wall 181 or the excitors 182 and 183. In FIG. 11, the cross-sectional area of the interior 184 increases gradually because of the gradual slope of the refractory wall.

Figure 12:
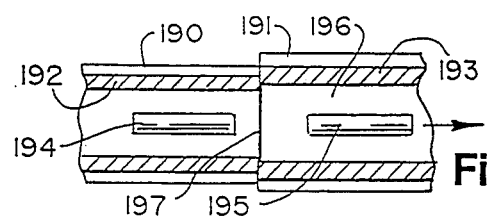
Figure 13:
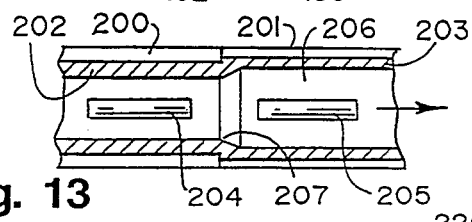

In FIG. 12 appears another reburn section. It too has the outer wall 190 and 191, the refractory 192 and 193, and the excitor sections 194 and 195. As shown there, the interior 196 experiences a sharp, discontinuous increase at the juncture 197. This may, for example, represent the juncture between two separate reburn stages as shown in FIGS. 2 and 3 and discussed above.

FIG. 13 again shows a reburn section having the outer wall 200 and 201, refractory sections 202 and 203 and excitor sections 204 and 205. There, the interior volume 206 increases gradually at the juncture 207 between the two sections. However, the sloping wall at the juncture 207 results in less adding another undesired turbulence than the very sharp discontinuity 197 shown in FIG. 12.

Figure 14:
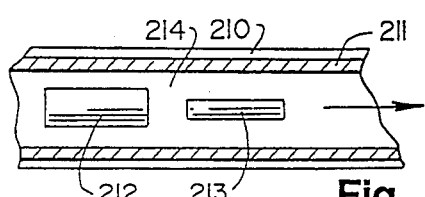

Another reburn section appears in FIG. 14 and includes the outer wall 210, the refractory 211, and the excitor sections 212 and 213. The smaller cross-sectional area of the excitor 213 as compared to the excitor 214 results in an increase in the cross-sectional area 214 of the interior as the gas travels from the excitor 212 to the excitor 213.

Figure 15:
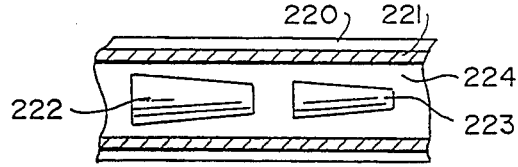

Finally, FIG. 15 shows the reburn section with the walls 220 and 221 and the excitor sections 222 and 223. The conic shape of the excitor sections 222 and 223 results in a gradual increase of the volume of the gas as it passes across them in the interior 224.

The initial combustion of the refuse, of course, takes place in the main chamber 32 as seen in FIGS. 16 and 17. The screw feeders 230 may assist in the introduction of particulate refuse such as rice hulls. More typically, bulk refuse enters through the opening 231 in the forewall 232. In any event, the bulk refuse entering the incinerator 32 sits upon the grate generally at 234. It will rest there briefly to permit combustion to commence.

If the refuse has a high moisture content, it may undergo drying while it rests upon the grate 234 to permit its more facile subsequent burning. If, upon entering, it immediately sat upon the hearth 433, it would experience greater difficulty in drying in order to undergo subsequent combustion.

Alternately, a very high Btu content material such as plastics may burn at very high temperatures. If this occurred on the floor 33, the uneven heating could cause slagging of the floor itself.

Thus, the refuse sits upon the grate 234, for a limited period of time. However, the majority of the fixed hydrocarbons within the material should remain unburned when the refuse slips through or off the grate 234 and onto the floor 33. The volatile hydrocarbon content may well have, by this time, already entered the gas stream.

As shown in FIGS. 16 and 17, the grate 234, to permit the refuse to fall to the floor 33, will include the holes 235 passing through it. The size of the openings of the holes 235 generally lies in the range of 12 to 18 inches. This permits most types of refuse to fall through to the floor prior to the burning of the majority of the fixed hydrocarbons.

The grate 234, of course, exists in the heated and corrosive environment of the main chamber 32. Thus, it should generally have some mechanism for cooling it to prevent its destruction by heat or corrosion. To effectuate this result, the grate 234 includes the hollow longitudinal pipes 236 and 237 and the cross pipes 238. The pipe 236 has the couplings 239 and 240 while the pipe 237 includes the couplings 241 and 242. This permits the passage through it of a fluid which will effectuate the cooling of the grate 234. The fluid thus introduced may take the form of air, water, steam, or oil.

Additionally, the pipes 236 to 238 of the grate 234 will have a refractory coating to provide further heat protection. Lastly, a wear surface composed typically of face hardened refractory will help protect the grate 234 from abrasion due to the refuse placed upon it.

The air grate shown generally at 349 in FIG. 25 includes the plenum 350 the top of which also forms a shelf for incoming refuse. The actual wall of the incinerator occurs along the dashed line 351. The plenum 350 receives a supply of air under pressure through the inlet 352. Some of the air may depart the plenum through the nozzles 353, but most of it goes into the hollow grate bars 354 of the grate. From there it travels until it reaches the nozzles 355 which allow it to enter the main chamber to provide oxygen for the combustion occurring there. Naturally, when refuse sits upon the bars 354, the air departing the nozzles 355 actually enters the combustion occurring there from below.

Additionally, some air from the grate bars 354 will enter the cross bar 359 and depart through the nozzles 360 to further support combustion. The actual structure of the grate bars 354 appears in the cross sectional views of FIGS. 26 and 27. As seen there, the bars 354 include the metal tube 363 which provides a channel for the passage of air. The moving air serves to cool the tube 363 and thus the bars 354. Additionally, the refractory 364 also helps to keep the heat off the metal tubes 363. Additionally, the refractory 364 may include an abrasion-resistant coating, at least along the top, to prevent damage from refuse placed on the grate 349.

Further, the cross-sectional views of FIGS. 26 and 27 show a staggered configuration of the nozzles 355. Thus in FIG. 26, the grate bar 354 has one nozzle 355 on the left and two nozzles 355 on the right. The opposite occurs in FIG. 27. The staggered configuration helps provide a more even distribution of the air leaving the grate 350 into the incinerator chamber.

The air grate 349 in FIG. 25 also shows several devices for controlling the amount of air passing through the nozzles 353, 355, and 360 into the incinerator chamber. Initially, of course, the pressure developed by the blower providing air along the inlet 352 may be controlled for this purpose. The outlets 370 connect to the plenum 350 and allow for the egress of air from it. This could find usefulness where the plenum 350 requires a large amount of air to keep it sufficiently cool. Yet that amount of air might introduce excessive air into the grate bars 354. Partially opening the outlets 370 permits the passage of air through them and thus the reduction in air pressure throughout the grate 349. Additionally, the guillotine dampers 371 each has a variable orifice that can also permit air to pass through the pipes 372 to the exterior of the main combustion chamber. This permits air to pass all the way through the grate 349 to keep it sufficiently cool but diverts some of the air away from entering the main combustion chamber. This too can avoid the undesired condition of excessive air there. The release of air, however, through the outlets 370 and through the dampers 371 should not, however, deprive the main incinerator chamber of sufficient air for combustion. Typically, the air grate 349 itself may provide at least about 40 percent of the air for the main chamber.

Furthermore, the amount of the air entering through the inlet 354 which departs though the outlets 370 and through the dampers 371 may change during the course of the incineration of a load of reuse. Thus, in the case of a fresh charge of refuse, the amount of air passing out through the nozzles 355 may start out low with a greater portion departing through the outlets 370 and through the dampers 371. This will permit the initiation of the combustion of the refuse. As the refuse begins to burn and releases hydrocarbons, the dampers 371 and the outlets 370 may close in part to provide greater air through the nozzles 355 because of the increased requirement for oxygen to support the combustion of the released hydrocarbons. Alternately or separately, very wet material placed upon the grate 349 may require additional air at the beginning to aerate the refuse and effectuate some drying. After a while, upon the accomplishment of this task, the burning mass will require less air from the nozzles. At this point, the amount of air should be controlled to achieve this objective. In summary, the amount of air introduced through the nozzles 355 may be fine tuned to suit the needs of the fire for the particular refuse introduced into the incinerator.

FIG. 25 also shows that the bars 354 meet the cross bar 359 at the expansion joints 375 and 376. As the grate 349 heats and cools, the bars 354, at the joints 375 and 376, may move further into or extract slightly out of the cross bar 359. To permit this relative motion between the grate bars 354 and the cross bar 359 without damaging the refractory, the joints 375 and 376 include the high temperature fibrous insulation plugs 377 and 378 respectively. These insulation plugs 377 and 378 can experience expansion and contraction without damaging themselves or the refractory 364 in the proximate areas. The similar fiberous insulation plugs 381 and 382 may occur around the pipe 372 where it meets the wall of the combustion chamber indicated by the dashed lines 383 and 384. Several companies provide suitable high temperature fiberous insulation including A. P. Green Industries, Inc., of Mexico, Mo., which sells the product under the mark Inswool Blanket, as well as Thermal Ceramics, Inc., which sells it as Kao-wool.

In FIG. 28 appears the cantilevered air grate indicated generally at 389 finding particular use for a large incinerator. As seen there, the grate bars 390 and 391 have the extensions 392 and 393, respectively, extending well beyond the incinerator wall, indicated diagrammatically by the dashed line 396, to the outside of the incinerator. The grate bars 390 and 391 may each have a length of about 20 feet for use in the large incinerator. They receive support in the area of the plenum 397. The extensions 392 and 393 simply provide counterbalancing lever arms for the cantilevered grate bars 390 and 391.

The blower 395 introduces air under pressure into the arm extensions 392 and 393. From there it goes to the plenum 397. Some of the air from the plenum enters directly into the main incinerator chamber through the nozzles 398. Other air enters the grate arms 390 and 391 and departs through the nozzles 399 shown in FIG. 29. Some of the air may pass through openings at the very ends of the grate arms 390 and 391.

The air passing through the plenum 397 and the grate bars 390 and 391 helps to keep them cool. It also warms the air which, when introduced into the main chamber through the nozzles 398 and 399, retains the heat within the incinerator system.

The refuse enters the incinerator of FIG. 28 from the right and passes onto the shelf of the plenum 397 and then onto the grate arms 390 and 391. The first portion of the grate arms it contacts appears in FIG. 29. As seen there, the grate arms 390 and 391 include the metal tubes 402 through which the air travels prior to passing through the nozzles 399 into the combustion chamber. The refractory 403 protects the metal tubes 402. Additionally, the top corners 405 have been rounded off. This helps to prevent refuse catching on top of the grate arms 390 and 391; rather, the rounded edge allows it to fall in the openings between the grate arms 390 and 391 onto the grate or hearth floor below. The section 406 of the grate arms 390 and 391 which the refuse may encounter further on in the incinerator chamber have the tapered sides 407. The garbage which passes over the rounded tops 406 will not likely wedge against the sides 407 since the opening between them gets larger going downward. This construction has the purpose of preventing refuse from lodging and hanging up rather than falling to the floor below.

FIG. 30 shows the tapering of the metal tubes 402 with the covering refractory 408 having a uniform thickness around them. As an alternative, the tubes could have a square configuration as shown in FIG. 29 with the refractory tapered and having a smaller width at the bottom to achieve the same overall configuration. Further, both the tubes 402 as well as the refractory 408 may taper toward the bottom to provide greater assurance that refuse will not hang up on the grate 398.

FIG. 31 shows a further cantilevered air grate generally at 413. Similar to the grate 389 shown in FIG. 28, the grate 413 in FIG. 31 has the cantilevered grate arms 414 and 415. However, because of the shorter lengths of the grate arms 414 and 415, it has no extension arms on the other side of the shelf 416 on the top of the plenum 417. Air for the plenum 417 enters through the inlets 418 and can pass directly through the nozzles 419 into the combustion chamber or into the grate arms 414 and 415 and through their nozzles 420.

FIG. 32 gives a cross sectional view of the grate arm 415 along the line 32—32 of FIG. 31 which slices through two nozzles 420 on its sides. As indicated in FIG. 32, the nozzles also have a staggering configuration with a subsequent nozzle on the bottom. This again helps induce superior mixing and avoids hot spots which can lead to slagging. As before, the grate arm 415 has the metal tube 424 through which the air passes. The metal tube 424 in turn has the refractory coating 425 for its protection from the heat. The rounded corners 426 at the top again help prevent catching the burning refuse on top and allow it to fall to the floor below.

The discussion above with regards to FIGS. 25 pointed out that an excess air could flow through the air grate 349 and in particular through the grate arms 354 to effectuate their cooling. This excess air would then pass through the cross bar 359 and out through the dampeners 371 and the pipes 372. This excess air would not enter the main combustion chamber where it could provide too much oxygen. It simply passes back outside of the combustion chamber to carry away heat that could otherwise have a destructive effect upon the grate arms 354. In FIG. 31, however, no cross bar attaches to the cantilevered grate arms 414 and 415 at their distal ends 428 and 429 located away from the plenum 416. Thus, the excess air that might be required to cool the grate arms 414 and 415 cannot pass to the outside of the inner incinerator without entering the main combustion chamber since the distal ends 428 and 429 of the grate arms 414 and 415 do not have a cross bar and do not directly connect to the outside. This, of course, results from the fact that the grate arms 414 and 415 have a cantilevered structure; in other words, the distal ends 427 and 428 do not have support or any other connection to the exterior of the incinerator. Accordingly, as seen in FIG. 32, the return tube 430 sits inside of the main metal air tube 424. The return tube 430 sits upon the legs 431 and permits the passage of air from the grate arms 414 and 415 to the exterior of the incinerator chamber through the proximal ends 433 and 434. Valves placed on the ends 433 and 434 determine how much of the air may escape from the grate arms 414 and 415 directly to the atmosphere without passing to the main combustion chamber and how much will enter the combustion chamber in order to support combustion. As seen in FIG. 31, the return tubes have the openings 434 to permit the entry of air from the main air tube 424 so that it may pass out the proximal ends 433 and 434 to the atmosphere.

FIG. 33, similar to the air grate 349 in FIG. 25, includes the initial bars 442 coupled to the front end bar 443. Air may enter the front and bar 443 through either or both of its ends 444 and 445. The air can then travel along the grate bars 446 to the cross bar 447. Then it travels out either or both of the cross bar ends 448 and 449. In fact, air may enter or depart through any of the ends 444, 445, 448, or 449. Selecting the ends through which to introduce air and through which air may depart allows the control of the amount of air passing both through the air grate 441 and one or more of the ends 444, 445, 448, and 449 without entering the main combustion chamber. It also results in the separate control of the amount of air passing from the air grate 441 through the nozzles 451 and into the combustion chamber. Seen in FIG. 34, the nozzles 451 on the front end bar 443 have the usual staggered configuration sending air in all directions. However, the cross bar 449 has nozzles, as seen in FIG. 34, which only point backwards or downwards. This is to keep the air within the general vicinity of the air grate 441 upon which the garbage sits. As seen in FIG. 33, the garbage enters from the top, or upon the initial bars 442. If it travels beyond the cross bar 447, it will clearly fall to the floor below. It will then receive its oxygen from the floor, Air introduced from the cross bar 447 should generally go in the direction in which it will contribute to the combustion of the garbage sitting on the grate 441. This can only be in the direction of the interior of the grate 441 itself. Similar considerations apply to the nozzles 451 of the grate bars 446 as seen in FIG. 35. The orientation of the nozzles tend to introduce air towards the middle of the grate as opposed towards the outside.

The portion of the air grate indicated generally at 463 in FIG. 36 appears similar to the air grate 441 of FIGS. 33 to 35. However, the air grate 463 includes provisions to allow for moving it to dislodge and move refuse placed upon it. Refuse enters through the opening 464 and moves across the initial bar 465 to the plenum bar 466 which, of course, would have a protective refractory covering. The refuse then travels to the grate bars 469 and possibly as far as the cross bar 470. To provide for motion, the plenum bar 466 attaches to the stem 473 which couples through the wall of the furnace to the air bag 475. Introducing air under pressure into the air bag 475 through the conduit 476 and, subsequently, allowing that air to move back out of the air bag 475 inflates and deflates the air bag 475. This in turn causes the stem 43 and the plenum bar 466 to move up and down to jostle the refuse and cause it to move either further down toward the cross bar 470 or even preferable fall through the grate 463 onto the floor below where it may continue to burn. The cross bar 470, to permit motion of the grate 463, rides on the three rollers 479 which permit it to rotate slightly as the plenum bar 466 moves up and down. Other types of motion might, in various circumstances, provide for more efficient movement of the refuse on the grate. Thus, the grate could achieve arcuate motion similar to that seen in U.S. Pat. Nos. 4,706,578 and 4,475,469 John N. Basic, Sr., for incinerator hearth floors.

Lastly, in FIG. 37 appears the air grate indicated generally at 485. It includes the plenum bar 486 and the grate bars 487. As seen in FIG. 38, the grate bars 487 have a diamond cross-sectional configuration. This actually allows for the wedging of refuse upon the upper surfaces 488 between the two grate bars 487. This finds use where the nature of the refuse placed upon the air grate 485 should cause it to linger longer upon the grate 485 before falling to the floor below.

The floor 33 of FIG. 1 may assume a number of forms. A particular and advanced type of pulsed hearth floor appears in Basic's U.S. Pat. No. 4,475,469 mentioned above. Other types of floors may work also, displaying various degrees of desirability.

Thus, for example, the floor 33 may simply be form of a stationary hearth. Some form of a ram or other pusher would then typically move the refuse along until it burned into ashes which would then fall into an appropriate collector. Often, however, the floor will experience some form of movement to assist the burning refuse in traveling from the inlet to the outlet of the main chamber 32.

The floor 33 may often constitute a hearth, whether moving or stationary. Experience indicates that the former represents the preferred technique. The pulsating hearth, whether in the configuration shown in Basic's patent or otherwise has proved most efficient. In Basic's patent, the hearth experiences arcuate movement, in pulses, in the direction from the inlet 231 toward the outlet. It moves more rapidly in the former direction than the latter in order to toss the refuse along almost in a snow-shovel type movement.

The hearth floor 33 shown in FIG. 16 has a shape that has proved beneficial in the burning of many types of refuse. Here, the floor inclines from the inlet 232 to the outlet ash pit 244. This slight lean built into the upper floor 33 and the lower floor 34 assists the refuse in moving in response to any motion experienced by the floors.

Additionally, the floors 33 and 34 include the ridges 246 and 247, respectively, on their upper surfaces. This helps channel and shuffle the refuse sitting there to aid in its combustion. The jets 248 on the upper floor 33 and 249 on the lower floor 34 provide under-fire air to assist combustion to the burning refuse.

As shown in FIG. 17, the nozzles 249, as do the nozzles 248 of the upper floor 33, the lower floor 34, incline downwards as they introduce the air into the main chamber 32. This downward angle on the nozzles 249 and 248 helps prevent the entrance of particles of refuse into them which could result in their clogging.

The amount of air introduced through the nozzles 248 and 249 may vary depending upon the conditions within the incinerator system in general in the main chamber 32 in particular. Thus, as discussed above, the system may contain insufficient refuse to operate at or near capacity. Introducing in this case less air through these jets, may assist the entire incinerator system to reach or remain at its proper operating temperature.

Instead of the hearth floors 33 and 34, the main chamber 32 could include a grate floor underneath the grate 234. The refuse would fall from the upper grate to the lower grate and then undergo its full combustion. This lower grate may then either remain stationary or experience some type of movement to transfer the burning refuse in the direction of the ash pit 244.

This may work in conjunction with utilization of the choke dampers 91 and 92. One method of accomplishing the reduction of the air in the main chamber would simply involve turning off the air introduced in the second pulsating hearth floor 34.

The main chamber 32 includes the membrane sidewalls 253 and 254 which appear diagrammatically in FIGS. 16 AND 17. In these walls, the water passes through the lower inlet pipes 255 and 256. From there it passes through the tubules 257 and 258 of the membrane walls 253 and 254 to the header pipe 259. From there it may travel elsewhere to provide useful energy in the form of steam for electricity, heating, or other purposes.

As discussed above, the main chamber may not have sufficient refuse to support the heat throughout the incinerator system. In this eventuality, the amount of heat taken out through the header 259 may suffer a reduction in order to leave sufficient heat within the main chamber and reburn tunnels to maintain the temperatures required for clean and efficient burning.

The ash pit 244 of the main chamber 32 includes the screw feeders 263 and 264. These remove ashes from the pit 244. However, as with other ash removal systems such as the chain drag system, the moving components of the screw feeders 263 and 264 sit under the water and in the ash pit where any repair proves difficult. A significantly improved type of ash removal system appears in FIGS. 18 to 25.

The ash pit 35 appears at the bottom of FIG. 18. Typically, it will contain water 271 and the ashes 272 at the bottom. The water 271, of course, provides a seal between the interior of the main combustion chamber and the room atmosphere.

Naturally, from time to time the ashes 272 must undergo removal from the pit 35. To accomplish this objective, the scoop mechanism shown generally at 273 descends along the track 277 until the scoop 278, in the configuration shown in solid lines in FIG. 18, enters the water 271 and digs into the ash heap 272. It then reverts to its carrying configuration shown in dashed lines in FIG. 18 while remaining at the bottom of the pit 272. This allows the scoop 278 to capture a portion of the ashes 272.

The scoop mechanism 273 then rises along the track 277. Desirably, it will stop shortly after lifting the scoop 278 itself out of the water 271. The water entrained with the ashes 272 will then have an opportunity to drain through the openings 281 in the bottom of the scoop 278. The back of the track 277 forms a trough 278 which will guide the dripping water back into the pit 35.

When the mechanism 273 has returned to its elevated position as shown in FIG. 18, the scoop 278 moves from its holding configuration shown in dashed lines to its release configuration shown in solid lines. The ashes then fall from the scoop 278 through the opening 282 in the trough 278 and into the truck 37 or other container. The side guards 283 keep the ashes from splattering outside of the truck 37.

The scoop mechanism 273 moves upward and downward under the influence of the cable 284. At one end, the cable 284 attaches to a typical winch which winds up and releases the cable 284 depending upon the winch's controls. In turn, the cable 284 passes over the pulley 285 and attaches to the scoop mechanism 273. When the winch unwinds the cable 284, the latter passes over the pulley 285 and allows the scoop mechanism 273 to descend into the pit 35. When the winch winds up the cable 284, it pulls on the scoop mechanism 273 dragging it out of the water and up the track 277.

The scoop mechanism, or trolley, 273 appears in greater detail in FIGS. 19 and 20. The trolley 273 first consists of the rigid frame formed by the runner bars 288 and 289, and the front crossbar 290 and the rear crossbar 291 rigidly adhered to the runner bars 288 and 289. The front wheels 292 and 293 and the rear wheels 294 and 295 ride inside of the track 277 as shown in FIG. 21. Further, the horizontal guide wheels 296 and 297 press against the tracks 277 from the outside of the rear wheels 294 and 295, respectively. This assures proper alignment of the trolley 273 on the track 277.

The arrangement of the guide wheels 296 and 297 has a further advantage in considering the use of the trolley 273 in removing ashes from the pit 35. Specifically, the rear wheels 294 and 295 riding inside of the track members 277 and the guide wheels 296 and 297 pressing against the side of the track members 277 largely orient the scoop mechanism 273 on the track 277. When the cable 284 allows the scoop 278 to descend into the pit 35, only the front end of the trolley 273 actually enters the water 271. The rear of the trolley 273, including the wheels 294 to 297, remain at all times outside of the water 271.

Thus, the wheels which must make intimate and proper contact with the track 277 to primarily orient the trolley 273 remain out of the water which could cause it to corrode or become impeded by debris within the water.

Keeping the rear of the trolley 273 out of the water has further advantages with regards to controlling the configuration of the scoop 278. The scoop 278 includes the ridgedly attached flange 301 to which the rod 302 pivotally connects at the juncture 303. The other end of the rod 302 connects to a piston contained within the cylinder 306. The piston 306 in turn pivotally connects to the flanges 307 and 308 on the rear crossbar 291.

When the pressure within the cylinder 306 forces its piston to move outward, it extends the bar 302 to the right in FIGS. 19 and 20. This in turn causes the flange 301 to move downward. As a consequence, the scoop 278 moves around its rotating couplings 309 and 310 to the side bars 288 and 289. This causes the scoop 278 to move from the position shown in solid in FIGS. 18 and 19 to that shown by the dashed lines.

Conversely, when the pressure within the cylinder retracts the piston, the bar 302 moves to the left of FIGS. 19 and 20 and pulls the connection 303 with the flange 301 in that same direction. This in turn causes the flange 301 and the scoop 278 to rotate in the clockwise direction from the position shown in phantom FIG. 19 to that shown in solid lines. This moves the scoop from the releasing configuration to the holding configuration where it will retain ashes. This motion takes place, of course, with the scoop 278 in the pit 35 so that it may grab onto a portion of the ashes 272.

During the latter, or grabbing, type of motion, the scoop 278 may contact a solid object in the pit 35. This happens since the incinerator system 30 accepts bulk refuse without presorting. A common item that may find its way into the pit 35 is a muffler or other solid discard. Desirably, the cylinder 306 should not attempt to force the movement of the scoop 278 any further. Thus, in this intermediate configuration, the scoop 278 will remain in contact with the solid object.

As the trolley 273 then moves up the track 277, it will drag the solid object with it. At its top position, the scoop 278 will again move to its release position and drop the muffler or other solid item into the truck 37. The use of pneumatic controls for the cylinder 306 will provide it with this cushioning or flexibility to allow it to remove such solid objects without damage to itself or the track 277.

As further assistance, the controls may actually reduce the pressure within the cylinder 306 once the scoop 278 contacts the solid object within the pit 35. This provides additional assurance that the solid object will not damage any component of the ash removal system.

The fluid for controlling the cylinder 306 passes through the hoses 315 and 316 which in turn wrap around the reel 317. As the trolley 273 moves up and down the track 277, the reel 317 releases and recaptures the midportions 319 and 320 of the hoses to keep them out of the way of the trolley 273.

Again, with the trolley 273 in its lowest position where the scoop 278 enters the pit 35, the cylinder 306 and the reel 317 remain out of the water. They thus avoid the deleterious effects of the water, the ashes, and the chemicals contained in both of them. Furthermore, the winch operating the cable 284, as appears from FIG. 18, will always remain out of the water.

FIG. 22 shows the track mechanism generally at 325, but with a slightly different chute mechanism for delivering the ashes into the truck 37. The track 277 and the trolley 273 remain virtually the same as before.

However, the track 325 includes the rotating chute guide 326 which assumes the configuration shown in FIG. 22 with the trolley 273 near the top of the track. Then the scoop 278 moves from its retaining to its releasing configuration. When this occurs and the ashes drop from the scoop, the chute guide 326 directed the ashes to the truck 37. After the ashes have entered the truck 37, the chute guide 326 rotates in the counterclockwise direction shown in FIG. 22 so that its shovel 327 forms a portion of the trough 328.

The mechanism for controlling the rotating chute guide 326 appears more clearly in FIG. 23 which shows the opposite side of the track 325 from that seen in FIG. 22. As seen there, the operation of the rotating track portion 327 of the chute 326 results from the influence of the cylinder 330. When the cylinder 330 forces out its piston, the latter connects to the lever arm 331 rigidly attached to the rotating track portion 327. In that instance, the lever arm 331 will take the position shown in phantom and the track portion 327 will connect with the remaining of the chute 328.

When the piston 330 contracts, it pulls the lever arm 331 to the right to the position shown in FIG. 23 resulting in the track portion 327 rotating clockwise. This causes the debris from the scoop 278 to fall through to the truck 37.

An alternate type of scoop mechanism appearing generally at 337 in FIG. 24. It utilizes the same trolley as in FIGS. 19 and 20. Thus, it includes the same runner bars 288 and 289 with the crossbars 290 and 291. It moves along the track in the same manner as described previously utilizing the wheels 292 to 297.

This trolley employs, instead of the scoop 278 shown in the prior figures, the bucket 338 which has the holes 339 for water to pass through. The bucket 338 has a rotational coupling at the juncture 292 and the flange 340 which controls its configuration. The flange 340 in turn connects to the lever arm 341 which attaches to the usual bar 302. In turn, the bar 302 connects to a piston within the hydraulic cylinder 339. The cylinder 339, in turn, has a pivotal coupling to the flange 340 which must be added to the trolley 273 as of FIGS. 19 and 20.

To assure the proper movement of the bar 302 and the lever arm 341, the bar 302, at its juncture 303, also couples to the lever arm 346. The latter pivotally couples to the flange 347 attached by the braces 348 to the crossbar 290. The lever arm 346 thus assures the correct rotational motion of the juncture 303 and, concomitantly, the scooping movement of the bucket 338.

In operation, the extension of the rod 302 by the cylinder 344 will cause the bucket 338 to rotate in the clockwise direction in FIG. 24. In this configuration, it will not hold debris. The trolley 333 then descends into the water with the bucket 338 travelling between the track 277 and the trough 328.

When the bucket 338 reaches the bottom of the pit 35, the cylinder 344 retracts the bar 302. Under the influence of the lever arms 341 and 346, this causes the bucket 338 to rotate in the counterclockwise direction in FIG. 24. In effect, this induces the bucket, when in the pit, to move forward to scoop up ashes.

The trolley 337 then moves up the track 277. Then the cylinder extends the rod 302, and the bucket rotates in the clockwise direction of FIG. 24 and dumps its contents.

The use of the bucket 338 would appear warranted in situations producing heavy ash or debris such as gravel undergoing decontamination in the incinerator system. The stronger, hydraulic cylinder 344 would give the bucket 338 additional force to dig out the contents of the pit 35.

In comparison, the back hoe scoop 278 shown in FIGS. 19 and 20 would appear more desirable for the usual municipal waste. There the scoop 278 may have to stop its motion in the forward direction when contacting a solid object like a muffler or a bicycle. The pneumatic cylinder 306 has a greater cushioning to permit the scoop 278 to stop its motion when it makes the contact and yet not destroy either the cylinder 306 or the scoop 278. Further more, the valving for the cylinder 306 may reduce the pressure should the scoop 278 contact such a solid object. This helps avoid destruction in many of the components of the trolley 273 or the track 277.

Switching between the scoop 278 and the bucket 338 requires only minimal effort. Naturally, to carry the latter, the trolley should include the brackets 345 and 347. Otherwise, switching between the two mechanisms simply involves exchanging the cylinders 306 and 344 and the scoop 278 with the bucket 338. Additionally, the bucket 338 requires the lever arms 341 and 346 while the scoop 278 does not use any such lever arm. Thus, the ash removal system may employ either type of scoop depending upon the refuse placed into the incinerator.

Accordingly, what is claimed is:

1. A device for removing ashes from a pit containing water comprising:
    (A) an elongated track having first and second ends, with said first end being located in proximity to said pit and said second end being located further away and at a higher level than said first end;
    (B) scoop means adapted to move along said track and having first and second configurations for, when in said first configuration, holding ashes, and, when in said second configuration, releasing ashes held by said scoop means;
    (C) elevator means for moving said scoop means along said track between (1) a first position near said first end, said scoop means being in the water and near the bottom of said pit while in said first position, and (2) a second position near said second end, said scoop means being out of the water in said pit while in said second position; and
    (D) control means, coupled to said scoop means and operating independently of the precise location of said scoop means along said track, for moving said scoop means, when at said first position, from said second to said first configuration and, when at said second position, from said first to said second configuration.

2. The device of claim 1 wherein said scoop means includes holes passing through the bottom of said scoop means which, when said scoop means is in said first configuration are of a size to allow water but substantially none of said debris to pass through.

3. The device of claim 2 wherein said control means, when said scoop means is in said first position, remains out of the water in said pit.

4. The device of claim 3 wherein said elevator means is located at a height above said pit.

5. The device of claim 3 wherein at least a portion of said track located near said pit has the configuration of a trough and is water-tight.

6. The device of claim 5 wherein said elevator means, when moving said scoop means from said first position towards said second position, is also for stopping said scoop means prior to reaching said second position at a predetermined location for a period of time to allow water contained within said scoop means to drain out of said scoop means.

7. The device of claim 5 where at least a portion of said track, having said configuration of a trough, has first and second orientations, said portion when in said first orientation forming a continuous trough with the remainder of said track, and, when in said second orientation, forming a chute diverting any material falling thereon to a location away from said track, said portion being located between said pit and said scoop means when in said second position, and further including changing means, coupled to said portion for moving said portion between said first and said second orientations.

8. The device of claim 1 wherein said control means, when said scoop means, when moving into said first configurations, contacts, at a third configuration between said first and said second configurations, a substantially solid object, is also for retaining said scoop means in said third configuration.

9. The device of claim 8 wherein said scoop means includes holes which, once said scoop means is in said first configuration, passes through the bottom of said scoop means and are of a size to allow water but substantially none of said debris to pass through.

10. The device of claim 1 wherein said scoop means is a first scoop means and further including a second scoop means adapted to move along said track and having third and fourth configurations for, when in said third configuration, holding ashes, and, when in said fourth configuration, releasing ashes held by said scoop means, and said control means couples to said second scoop means for moving said second scoop means, when in said first position, from said fourth to said third configuration and, when in said second position, from said third to said fourth configuration, and said elevating means couples to said second scoop means for moving said second scoop means along said track between said first position and said second position.

11. The device of claim 10 wherein said control means, when moving said first scoop means from said second configuration to said first configuration is also for moving said first scoop means in the direction opposite to which said control means moves said second scoop means when moving it from said fourth to said third configuration.

12. The device of claim 11 wherein said first and second scoop means each include holes which, once said scoop means is in said first configuration, passes through the bottom of said first and second scoop means and are of a size to allow water but substantially none of said debris to pass through.

13. A method for removing debris from a pit containing water comprising:
(A) moving a scoop means downward along an elongated track having a first end located in proximity to said pit and a second end located further away and at a higher level than said first end;
(B) stopping the downward movement of said scoop means when said scoop means is near the bottom of said pit;
(C) independent of the precise location of said scoop means along said track, moving said scoop means, means while in said pit, to a first configuration in which scoop means will retain debris from a second configuration in which said scoop means will retain substantially no debris;
(D) while in said first configuration, moving said scoop means upward along said track and out of said pit; and
(E) while out of said pit and independently of the precise location of said scoop means along said track, moving said scoop means from said first configuration to said second configuration.

14. The method of claim 13 including allowing water to pass out of said scoop means through holes in the bottom of said scoop means.

15. The method of claim 14 including stopping the downward moving of said scoop means before all of said scoop means immerses in said water.

16. The method of claim 15 further including retaining water passing out of said holes in the bottom of said scoop means on said track and passing said water on said track back to said pit.

17. The method of claim 16 including stopping said scoop means while moving upward along said track prior to when said scoop means moves from said first configuration to said second configuration and allowing the water contained in said scoop means to drain out onto said track.

18. The method of claim 17 including moving a portion of said track that forms a trough and is located at a position lower than the position on said track at which said scoop means is moved from said first to said second configurations from a first orientation in which said portion will direct material passing from said scoop means towards said pit to, after said scoop means has moved above said portion, a second orientation in which said portion will direct material departing from said scoop means away from said track.

19. The method of claim 18 further including stopping the moving of said scoop means at a third configuration while moving towards said first configuration from said second configuration when said scoop means makes contact with a substantially solid object in said pit and retaining said scoop means in said third configuration while said scoop means moves upward along said track.

20. The method of claim 14 wherein said scoop means is a first scoop means and further including replacing said first scoop means on said track with a second scoop means, moving said second scoop means downward along said track, stopping the downward movement of said second scoop means while said second scoop means is near the bottom of said pit, moving said second scoop means while in said pit, to a third configuration in which said second scoop means will retain debris from a fourth configuration in which said second scoop means will retain substantially no debris, while in said third configuration, moving said second scoop means upward along said track and out of said pit, and while out of said pit, moving said second scoop means from said third configuration to said fourth configuration.

21. The method of claim 20 in which said second scoop means while on said track and moving from said third configuration to said fourth configuration moves in an opposite direction that said first scoop means while on said track, moves while moving from said first configuration to said second configuration.

22. A device for removing ashes from a pit containing water comprising:
(A) an elongated track having first and second ends, with said first end being located in proximity to said pit and said second end being located further away and at a higher level than said first end, at least a portion of said track located near said pit having the configuration of a trough and being substantially water tight, said portion having first and second orientations, said portion when in said first orientation forming a continuous trough with the remainder of said track, and, when in said second orientation, forming a chute diverting any material falling thereon to a location away from said track, said portion being located between said pit and said scoop means when in said second position;

(B) changing means, coupled to said portion for moving said portion between said first and said second orientations;

(C) scoop means adapted to move along said track and having first and second configurations for, when in said first configuration, holding ashes, and, when in said second configuration, releasing ashes held by said scoop means;

(D) elevator means for moving said scoop means along said track between (1) a first position near said first end, said scoop means being in the water and near the bottom of said pit while in said first position, and (2) a second position near said second end, said scoop means being out of the water in said pit while in said second position; and (E) control means, coupled to said scoop means, for moving said scoop means, when at said first position, from said second to said first configuration and, when at said second position, from said first to said second configuration.

23. A device for removing ashes from a pit containing water comprising:

(A) an elongated track having first and second ends, with said first end being located in proximity to said pit and said second end being located further away and at a higher level than said first end;

(B) first scoop means adapted to move along said track and having first and second configurations for, when in said first configuration, holding ashes, and, when in said second configuration, releasing ashes held by said scoop means;

(C) second scoop means adapted to move along said track and having third and fourth configurations for, when in said third configuration, holding ashes, and, when in said fourth configuration, releasing ashes held by said scoop means;

(D) elevator means, coupled to said first scoop means or said second scoop means, for moving said scoop means along said track between (1) a first position near said first end, said scoop means being in the water and near the bottom of said pit while in said first position, and (2) a second position near said second end, said scoop means being out of the water in said pit while in said second position and for moving said second scoop means along said track between said first position and said second position; and (E) control means, coupled to said first and second scoop means, for moving said first scoop means, when at said first position, from said second to said first configuration and, when at said second position, from said first to said second configuration and for moving said second scoop means, when in said first position, from said fourth to said third configuration and, when in said second position, from said third to said fourth configuration.

24. The device of claim 23 wherein said control means, when moving said first scoop means from said second configuration to said first configuration moves said first scoop means in the direction opposite to which said control means moves said second scoop means when moving it from said fourth to said third configuration.

25. The device of claim 24 wherein said first and second scoop means each include holes which, once said scoop means is in said first configuration, passes through the bottom of said first and second scoop means and are of a size to allow water but substantially none of said debris to pass through.

26. A method for removing debris from a pit containing water comprising:

(A) moving a scoop means downward along an elongated track having a first end located in proximity to said pit and a second end located further away and at a higher level than said first end, (B) stopping the downward movement of said scoop means when said scoop means is near the bottom of said pit and before all of said scoop means immerses in said water;

(C) moving said scoop means, while in said pit, to a first configuration in which scoop means will retain debris from a second configuration in which said scoop means will retain substantially no debris;

(D) while in said first configuration, moving said scoop means upward along said track and out of said pit; and (E) while out of said pit, moving said scoop means from said first configuration to said second configuration.

27. The method of claim 26 including allowing water to pass out of said scoop means through holes on the bottom of said scoop means.

28. The method of claim 27 further including retaining water passing out of said holes in the bottom of said scoop means on said track and passing said water on said track back to said pit.

29. The method of claim 28 including stopping said scoop means while moving upward along said track prior to when said scoop means moves from said first configuration to said second configuration and allowing the water contained in said scoop means to drain out onto said track.

30. The method of claim 29 including moving a portion of said track that forms a trough and is located at a position lower than the position on said track at which said scoop means is moved from said first to said second configurations from a first orientation in which said portion will direct material passing from said scoop means towards said pit to, after said scoop means has moved above said portion, a second orientation in which said portion will direct material departing from said scoop means away from said track.

31. The method of claim 30 further including stopping the moving of said scoop means at a third configuration while moving towards set first configuration from said second configuration when said scoop means makes contact with a substantially solid object in said pit and retaining said scoop means in said third configuration while said scoop means moves upward along said track.

32. A method for removing debris from a pit containing water comprising:

(A) moving a first scoop means downward along an elongated track having a first end located in proximity to said pit and a second end located further away and at a higher level than said first end, (B) stopping the downward movement of said first scoop means when said first scoop means is near the bottom of said pit;

(C) moving said first scoop means, while in said pit, to a first configuration in which scoop means will retain debris from a second configuration in which said first scoop means will retain substantially no debris;

(D) while in said first configuration, moving said first scoop means upward along said track and out of said pit;

(E) while out of said pit, moving said first scoop means from said first configuration to said second configuration;

(F) replacing said first scoop means on said track with a second scoop means;

(G) moving said second scoop means downward along said track;

(H) stopping the downward movement of said second scoop means while said second scoop means is near the bottom of said pit;

(I) moving said second scoop means while in said pit, to a third configuration in which said second scoop means will retain debris from a fourth configuration in which said scoop means will retain substantially no debris, while in said third configuration;

(J) moving said second scoop means upward along said track and out of said pit; and (K) while out of said pit, moving said second scoop means from said third configuration to said fourth configuration.

33. The method of claim 32 in which said second scoop means while on said track and moving from said third configuration to said fourth configuration moves in an opposite direction that said first scoop means while on said track, moves while moving from said first configuration to said second configuration.

34. A device for removing ashes from a pit containing water comprising:

(A) an elongated track having first and second ends, with said first end being located in proximity to said pit and said second end being located further away and at a higher level than said first end;

(B) scoop means adapted to move along said track and having first and second configurations for, when in said first configuration, holding ashes, and, when in said second configuration, releasing ashes held by said scoop means;

(C) elevator means for moving said scoop means along said track between (1) a first position near said first end, said scoop means being in the water and near the bottom of said pit while in said first position, and (2) a second position near said second end, said scoop means being out of the water in said pit while in said second position; and (D) control means, coupled to said scoop means, for, independently of the direction of said track at said first and second positions, moving said scoop means, when at said first position, from said second to said first configuration and, when at said second position, from said first to said second configuration.

35. The device of claim 34 wherein said scoop means includes holes passing through the bottom of said scoop means which, when said scoop means is in said first configuration are of a size to allow water but substantially none of said debris to pass through.

36. The device of claim 35 wherein said control means, when said scoop means is in said first position, remains out of water in said pit.

37. The device of claim 36 wherein said elevator means is located at a height above said pit.

38. The device of claim 36 wherein at least a portion of said track located near said pit has the configuration of a trough and is water-tight.

39. The device of claim 38 wherein said elevator means, when moving said scoop means from said first position towards said second position, is also for stopping said scoop means prior to reaching said second position at a predetermined location for a period of time to allow water contained within said scoop means to drain out of said scoop means.

40. The device of claim 38 where at least a portion of said track, having said configuration of a trough, has first and second orientations, said portion when in said first orientation forming a continuous trough with the remainder of said track, and, when in said second orientation, forming a chute diverting any material falling thereon to a location away from said track, said portion being located between said pit and said scoop means when in said second position, and further including changing means, coupled to said portion for moving said portion between said first and said second orientations.

41. The device of claim 34 wherein said control means, when said scoop means, when moving into said first configurations, contacts, at a third configuration between said first and said second configurations, a substantially solid object, is also for retaining said scoop means in said third configuration.

42. The device of claim 41 wherein said scoop means includes holes which, once said scoop means is in said first configuration, passes through the bottom of said scoop means and are of a size to allow water but substantially none of said debris to pass through.

43. The device of claim 34 wherein said scoop means is a first scoop means and further including a second scoop means adapted to move along said track and having third and fourth configurations for, when in said third configuration, holding ashes, and, when in said fourth configuration, releasing ashes held by said scoop means, and said control means couples to said second scoop means for moving said second scoop means, when in said first position, from said fourth to said third configuration and, when in said second position, from said third to said fourth configuration, and said elevating means couples to said second scoop means for moving said second scoop means along said track between said first position and said second position.

44. The device of claim 43 wherein said control means, when moving said first scoop means from said second configuration to said first configuration is also for moving said first scoop means in the direction opposite to which said control means moves said second scoop means when moving it from said fourth to said third configuration.

45. The device of claim 43 wherein said first and second scoop means each include holes which, once said scoop means is in said first configuration, passes through the bottom of said first and second scoop means and are of a size to allow water but substantially none of said debris to pass through.

46. A method for removing debris from a pit containing water comprising:

(A) moving a scoop means downward along an elongated track having a first end located in proximity to said pit and a second end located further away and at a higher level than said first end, (B) stopping the downward movement of said scoop means when said scoop means is near the bottom of said pit;

(C) independently of the direction of said track, moving said scoop means, while in said pit, to a first configuration in which scoop means will retain debris from a second configuration in which said scoop means will retain substantially no debris;

(D) while in said first configuration, moving said scoop means upward along said track and out of said pit; and (E) while out of said pit and independently of the direction of said track, moving said scoop means from said first configuration to said second configuration.

47. The method of claim 46 including allowing water to pass out of said scoop means through holes on the bottom of said scoop means.

48. The method of claim 47 including stopping the downward moving of said scoop means before all of said scoop means immerses in said water.

49. The method of claim 48 further including retaining water passing out of said holes in the bottom of said scoop means on said track and passing said water on said track back to said pit.

50. The method of claim 49 including stopping said scoop means while moving upward along said track prior to when said scoop means moves from said first configuration to said second configuration and allowing the water contained in said scoop means to drain out onto said track.

51. The method of claim 50 including moving a portion of said track that forms a trough and is located at a position lower than the position on said track at which said scoop means is moved from said first to said second configurations from a first orientation in which said portion will direct material passing from said scoop means towards said pit to, after said scoop means has moved above said portion, a second orientation in which said portion will direct material departing from said scoop means away from said track.

52. The method of claim 51 further including stopping the moving of said scoop means at a third configuration while moving towards set first configuration from said second configuration when said scoop means makes contact with a substantially solid object in said pit and retaining said scoop means in said third configuration while said scoop means moves upward along said track.

53. The method of claim 46 wherein said scoop means is a first scoop means and further including replacing said first scoop means on said track with a second scoop means moving said second scoop means downward along said track, stopping the downward movement of said second scoop means while said second scoop means is near the bottom of said pit, moving said second scoop means while in said pit, to a third configuration in which said second scoop means will retain debris from a fourth configuration in which said scoop means will retain substantially no debris, while in said third configuration, moving said second scoop means upward along said track and out of said pit, and while out of said pit, moving said second scoop means from said third configuration to said fourth configuration.

54. The method of claim 53 in which said second scoop means while on said track and moving from said third configuration to said fourth configuration moves in an opposite direction that said first scoop means while on said track, moves while moving from said first configuration to said second configuration.

55. A device for removing ashes from a pit containing water comprising:

(A) an elongated track having first and second ends, with said first end being located in proximity to said pit and said second end being located further away and at a higher level than said first end;

(B) scoop means adapted to move along said track and having first and second configurations for, when in said first configuration, holding ashes, and, when in said second configuration, releasing ashes held by said scoop means;

(C) elevator means for moving said scoop means along said track between (1) a first position near said first end, said scoop means being in the water and near the bottom of said pit while in said first position, and (2) a second position near said second end, said scoop means being out of the water in said pit while in said second position; and (D) control means, coupled to said scoop means, for, independently of motion of said scoop means along said track, moving said scoop means, when at said first position, from said second to said first configuration and, when at said second position, from said first to said second configuration.

56. The device of claim 55 wherein said scoop means includes holes passing through the bottom of said scoop means which, when said scoop means is in said first configuration are of a size to allow water but substantially none of said debris to pass through.

57. The device of claim 56 wherein said control means, when said scoop means is in said first position, remains out of water in said pit.

58. The device of claim 57 wherein said elevator means is located at a height above said pit.

59. The device of claim 57 wherein at least a portion of said track located near said pit has the configuration of a trough and is water-tight.

60. The device of claim 59 wherein said elevator means, when moving said scoop means from said first position towards said second position, is also for stopping said scoop means prior to reaching said second position at a predetermined location for a period of time to allow water contained within said scoop means to drain out of said scoop means.

61. The device of claim 59 where at least a portion of said track, having said configuration of a trough, has first and second orientations, said portion when in said first orientation forming a continuous trough with the remainder of said track, and, when in said second orientation, forming a chute diverting any material falling thereon to a location away from said track, said portion being located between said pit and said scoop means when in said second position, and further including changing means, coupled to said portion for moving said portion between said first and said second orientations.

62. The device of claim 55 wherein said control means, when said scoop means, when moving into said first configurations, contacts, at a third configuration between said first and said second configurations, a substantially solid object, is also for retaining said scoop means in said third configuration.

63. The device of claim 62 wherein said scoop means includes holes which, once said scoop means is in said first configuration, passes through the bottom of said scoop means and are of a size to allow water but substantially none of said debris to pass through.

64. The device of claim 55 wherein said scoop means is a first scoop means and further including a second scoop means adapted to move along said track and having third and fourth configurations for, when in said third configuration, holding ashes, and, when in said fourth configuration, releasing ashes held by said scoop means, and said control means couples to said second scoop means for moving said second scoop means, when in said first position, from said fourth to said third configuration and, when in said second position, from said third to said fourth configuration, and said elevating means couples to said second scoop means for moving said second scoop means along said track between said first position and said second position.

65. The device of claim 64 wherein said control means, when moving said first scoop means from said second configuration to said first configuration, is also for moving said first scoop means in the direction opposite to which said control means moves said second scoop means when moving it from said fourth to said third configuration.

66. The device of claim 65 wherein said first and second scoop means each include holes which, once said scoop means is in said first configuration, passes through the bottom of said first and second scoop means and are of a size to allow water but substantially none of said debris to pass through.

67. A method for removing debris from a pit containing water comprising:
(A) moving a scoop means downward along an elongated track having a first end located in proximity to said pit and a second end located further away and at a higher level than said first end,
(B) stopping the downward movement of said scoop means when said scoop means is near the bottom of said pit;
(C) independently of motion of said scoop means along said track, moving said scoop means, while in said pit, to a first configuration in which said scoop means will retain debris from a second configuration in which said scoop means will retain substantially no debris;
(D) while in said first configuration, moving said scoop means upward along said track and out of said pit; and
(E) while out of said pit and independently of motion of said scoop means along said track, moving said scoop means from said first configuration to said second configuration.

68. The method of claim 67 including allowing water to pass out of said scoop means through holes on the bottom of said scoop means.

69. The method of claim 68 including stopping the downward moving of said scoop means before all of said scoop means immerses in said water.

70. The method of claim 69 further including retaining water passing out of said holes in the bottom of said scoop means on said track and passing said water on said track back to said pit.

71. The method of claim 70 including stopping said scoop means while moving upward along said track prior to when said scoop means moves from said first configuration to said second configuration and allowing the water contained in said scoop means to drain out onto said track.

72. The method of claim 71 including moving a portion of said track that forms a trough and is located at a position lower than the position on said track at which said scoop means is moved from said first to said second configurations from a first orientation in which said portion will direct material passing from said scoop means towards said pit to, after said scoop means has moved above said portion, a second orientation in which said portion will direct material departing from said scoop means away from said track.

73. The method of claim 72 further including stopping the moving of said scoop means at a third configuration while moving towards set first configuration from said second configuration when said scoop means makes contact with a substantially solid object in said pit and retaining said scoop means in said third configuration while said scoop means moves upward along said track.

74. The method of claim 68 wherein said scoop means is a first scoop means and further including replacing said first scoop means on said track with a second scoop means moving said second scoop means downward along said track, stopping the downward movement of said second scoop means while said second scoop means is near the bottom of said pit, moving said second scoop means while in said pit, to a third configuration in which said second scoop means will retain debris from a fourth configuration in which said scoop means will retain substantially no debris, while in said third configuration, moving said second scoop means upward along said track and out of said pit, and while out of said pit, moving said second scoop means from said third configuration to said fourth configuration.

75. The method of claim 74 in which said second scoop means while on said track and moving from said third configuration to said fourth configuration moves in an opposite direction that said first scoop means while on said track, moves while moving from said first configuration to said second configuration.

76. A device for removing ashes from a pit containing water comprising:
(A) an elongated track having a substantially straight segment and first and second ends, with said first end being located in proximity to said pit and said second end being located further away and at a higher level than said first end;
(B) scoop means adapted to move along said track and having first and second configurations for, when in said first configuration, holding ashes, and, when in said second configuration, releasing ashes held by said scoop means;
(C) elevator means for moving said scoop means along said track between (1) a first position near said first end, said scoop means being in the water and near the bottom of said pit while in said first position, and (2) a second position near said second end, said scoop means being out of the water in said pit while in said second position; and
(D) control means, coupled to said scoop means, for moving said scoop means, when at said first position and while on a substantially straight segment of said track, from said second to said first configuration and, when at said second position and while on a substantially straight segment of said track, from said first to said second configuration.

77. The device of claim 76 wherein said scoop means includes holes passing through the bottom of said scoop means which, when said scoop means is in said first configuration are of a size to allow water but substantially none of said debris to pass through.

78. The device of claim 77 wherein said control means, when said scoop means is in said first position, remains out of water in said pit.

79. The device of claim 78 wherein said elevator means is located at a height above said pit.

80. The device of claim 78 wherein at least a portion of said track located near said pit has the configuration of a trough and is water-tight.

81. The device of claim 80 wherein said elevator means, when moving said scoop means from said first position towards said second position, is also for stopping said scoop means prior to reaching said second position at a predetermined location for a period of time to allow water contained within said scoop means to drain out of said scoop means.

82. The device of claim 80 where at least a portion of said track, having said configuration of a trough, has first and second orientations, said portion when in said first orientation forming a continuous trough with the remainder of said track, and, when in said second orientation, forming a chute diverting any material falling thereon to a location away from said track, said portion being located between said pit and said scoop means when in said second position, and further including changing means, coupled to said portion for moving said portion between said first and said second orientations.

83. The device of claim 76 wherein said control means, when said scoop means, when moving into said first configurations, contacts, at a third configuration between said first and said second configurations, a substantially solid object, is also for retaining said scoop means in said third configuration.

84. The device of claim 83 wherein said scoop means includes holes which, once said scoop means is in said first configuration, passes through the bottom of said scoop means and are of a size to allow water but substantially none of said debris to pass through.

85. The device of claim 76 wherein said scoop means is a first scoop means and further including a second scoop means adapted to move along said track and having third and fourth configurations for, when in said third configuration, holding ashes, and, when in said fourth configuration, releasing ashes held by said scoop means, and said control means couples to said second scoop means for moving said second scoop means, when in said first position, from said fourth to said third configuration and, when in said second position, from said third to said fourth configuration, and said elevating means couples to said second scoop means for moving said second scoop means along said track between said first position and said second position.

86. The device of claim 85 wherein said control means, when moving said first scoop means from said second configuration to said first configuration, is also for moving said first scoop means in the direction opposite to which said control means moves said second scoop means when moving it from said fourth to said third configuration.

87. The device of claim 86 wherein said first and second scoop means each include holes which, once said scoop means is in said first configuration, passes through the bottom of said first and second scoop means and are of a size to allow water but substantially none of said debris to pass through.

88. A method for removing debris from a pit containing water comprising:
(A) moving a scoop means downward along an elongated track having a first end located in proximity to said pit and a second end located further away and at a higher level than said first end;
(B) stopping the downward movement of said scoop means when said scoop means is near the bottom of said pit;
(C) moving said scoop means, while in said pit and on a substantially straight segment of said track, to a first configuration in which said scoop means will retain debris from a second configuration in which said scoop means will retain substantially no debris;
(D) while in said first configuration, moving said scoop means upward along said track and out of said pit; and
(E) while out of said pit and on a substantially straight segment of said track, moving said scoop means from said first configuration to said second configuration.

89. The method of claim 88 including allowing water to pass out of said scoop means through holes on the bottom of said scoop means.

90. The method of claim 89 including stopping the downward moving of said scoop means before all of said scoop means immerses in said water.

91. The method of claim 90 further including retaining water passing out of said holes in the bottom of said scoop means on said track and passing said water on said track back to said pit.

92. The method of claim 91 including stopping said scoop means while moving upward along said track prior to when said scoop means moves from said first configuration to said second configuration and allowing the water contained in said scoop means to drain out onto said track.

93. The method of claim 92 including moving a portion of said track that forms a trough and is located at a position lower than the position on said track at which said scoop means is moved from said first to said second configurations from a first orientation in which said portion will direct material passing from said scoop means towards said pit to, after said scoop means has moved above said portion, a second orientation in which said portion will direct material departing from said scoop means away from said track.

94. The method of claim 93 further including stopping the moving of said scoop means at a third configuration while moving towards set first configuration from said second configuration when said scoop means makes contact with a substantially solid object in said pit and retaining said scoop means in said third configuration while said scoop means moves upward along said track.

95. The method of claim 89 wherein said scoop means is a first scoop means and further including replacing said first scoop means on said track with a second scoop means moving said second scoop means downward along said track, stopping the downward movement of said second scoop means while said second scoop means is near the bottom of said pit, moving said second scoop means while in said pit, to a third configuration in which said second scoop means will retain debris from a fourth configuration in which said scoop means will retain substantially no debris, while in said third configuration, moving said second scoop means upward along said track and out of said pit, and while out of said pit, moving said second scoop means from said third configuration to said fourth configuration.

96. The method of claim 95 in which said second scoop means while on said track and moving from said third configuration to said fourth configuration moves in an opposite direction that said first scoop means while on said track, moves while moving from said first configuration to said second configuration.

* * * * *